United States Patent
Kang et al.

(10) Patent No.: US 11,947,439 B2
(45) Date of Patent: Apr. 2, 2024

(54) LEARNING FROM DISTRIBUTED TRACES FOR ANOMALY DETECTION AND ROOT CAUSE ANALYSIS

(71) Applicant: International Business Machines Corporation, Armonk, NY (US)

(72) Inventors: Hui Kang, Briarcliff Manor, NY (US); Yu Deng, Yorktown Heights, NY (US); Xinyu Que, Yorktown Heights, NY (US); Sinem Guven Kaya, New York, NY (US); Bruce D'Amora, New Milford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 702 days.

(21) Appl. No.: 17/107,093

(22) Filed: Nov. 30, 2020

(65) Prior Publication Data

US 2022/0172067 A1   Jun. 2, 2022

(51) Int. Cl.
G06F 11/00   (2006.01)
G06F 11/07   (2006.01)
G06F 11/34   (2006.01)

(52) U.S. Cl.
CPC ...... *G06F 11/3466* (2013.01); *G06F 11/0751* (2013.01)

(58) Field of Classification Search
CPC .................... G06F 11/0751; G06F 11/3466
See application file for complete search history.

(56) References Cited

U.S. PATENT DOCUMENTS

| | | | |
|---|---|---|---|
| 6,338,159 B1 * | 1/2002 | Alexander, III | G06F 11/348 |
| | | | 702/179 |
| 7,877,642 B2 | 1/2011 | Ding et al. | |
| 8,595,709 B2 | 11/2013 | Rao et al. | |
| 9,772,898 B2 | 9/2017 | Deshpande et al. | |
| 10,484,410 B2 | 11/2019 | Fenoglio et al. | |

(Continued)

FOREIGN PATENT DOCUMENTS

| | | |
|---|---|---|
| CN | 109921927 | 6/2019 |
| CN | 110427275 | 11/2019 |

(Continued)

OTHER PUBLICATIONS

Rong, "word2vec Parameter Learning Explained," arXiv:1411.2738v4 [cs.CL] Jun. 5, 2016; 21 pages.

(Continued)

*Primary Examiner* — Joshua P Lottich
(74) *Attorney, Agent, or Firm* — Amin, Turocy & Watson, LLP

(57) ABSTRACT

Techniques facilitating anomaly detection and root cause analysis using distributed trace data. In one example, a system can comprise a processor that executes computer executable components stored in memory. The computer executable components comprise: a preprocessing component; and a monitor component. The preprocessing component can generate a trace frame comprising a vectorized representation of textual trace data produced by microservices of a microservice application. The monitor component can identify a state of the microservice application using the trace frame.

20 Claims, 17 Drawing Sheets

(56) References Cited

U.S. PATENT DOCUMENTS

| | | | | |
|---|---|---|---|---|
| 2006/0288261 | A1* | 12/2006 | Yuan | G06F 11/0715 714/48 |
| 2010/0235686 | A1* | 9/2010 | Sato | G06F 11/3636 714/45 |
| 2014/0365440 | A1* | 12/2014 | Steiner | G06F 16/128 707/639 |
| 2017/0063933 | A1 | 3/2017 | Shieh et al. | |
| 2017/0116114 | A1* | 4/2017 | Tosar | G06F 11/3684 |
| 2019/0121719 | A1* | 4/2019 | Hamon | G06F 11/3664 |
| 2019/0361766 | A1 | 11/2019 | Cardoso et al. | |
| 2020/0201750 | A1 | 6/2020 | Gadiya et al. | |
| 2020/0257680 | A1* | 8/2020 | Danyi | G06F 11/302 |
| 2020/0328952 | A1 | 10/2020 | Makwarth et al. | |
| 2020/0334093 | A1* | 10/2020 | Dubey | G06F 11/0778 |
| 2021/0303431 | A1* | 9/2021 | Grigoryan | G06F 11/3476 |
| 2022/0058072 | A1* | 2/2022 | Poghosyan | G06F 18/24317 |
| 2022/0058073 | A1* | 2/2022 | Poghosyan | G06F 11/079 |

FOREIGN PATENT DOCUMENTS

| | | |
|---|---|---|
| CN | 109861858 | 6/2020 |
| WO | 2020/125929 A1 | 6/2020 |

OTHER PUBLICATIONS

Perozzi et al., "DeepWalk: Online Learning of Social Representations," arXiv:1403.6652v2 [cs.SI] Jun. 27, 2014; 10 pages.

Grover et al., "node2vec: Scalable Feature Learning for Networks," arXiv:1607.00653v1 [cs. SI] Jul. 3, 2016; 10 pages.

Hamilton et al., "Inductive Representation Learning on Large Graphs," arXiv:1706.02216v4 [cs.SI] Sep. 10, 2018; 19 pages.

Gan et al., "Seer: Leveraging Big Data to Navigate the Complexity of Performance Debugging in Cloud Microservices," ASPLOS '19: Proceedings of the Twenty-Fourth International Conference on Architectural Support for Programming Languages and Operating Systems; Apr. 2019; pp. 19-33.

Zhang et al., "A Deep Neural Network for Unsupervised Anomaly Detection and Diagnosis in Multivariate Time Series Data," The Thirty-Third AAAI Conference on Artificial Intelligence (AAAI-19); 2019; 8 pages.

Nedelkoski et al., "Anomaly detection and classification using distributed tracing and deep learning," 2019 19th IEEE/ACM International Symposium on Cluster, Cloud and Grid Computing (CCGRID), Larnaca, Cyprus, pp. 241-250.

Medel et al., "Anomaly Detection in Video Using Predictive Convolutional Long Short-Term Memory Networks," Computer Science; 2016; 27 pages.

Del Giorno et al., "A Discriminative Framework for Anomaly Detection in Large Videos," arXiv:1609.08938v1 [cs.CV] Sep. 28, 2016; 16 pages.

Nogas et al., "Fall Detection from Thermal Camera Using Convolutional LSTM Autoencoder," Conference: 2nd Workshop on AI for Aging, Rehabilitation and Independent Assisted Living at IJCAI, Federated Artificial Intelligence Meeting; Jul. 2018; 5 pages.

Ardelean et al., "Performance Analysis of Cloud Applications," In NSDI; Usentix—The Advanced Computing Systems Association; 2018; 14 pages.

"Online Boutique," https://github.com/GoogleCloudPlatform/microservices-demo; 2018; 7 pages.

Brown et al., "Recurrent Neural Network Attention Mechanisms for Interpretable System Log Anomaly Detection," arXiv:1803.04967v1 [cs.LG] Mar. 13, 2018; 8 pages.

Chen et al., "Behavior2Vec: Generating Distributed Representations of Users' Behaviors on Products for Recommender Systems," ACM Transactions on Knowledge Discovery from Data, vol. 12, No. 4, Article 43. Publication date: Apr. 2018; 20 pages.

Chow et al., "The Mystery Machine: End-to-end Performance Analysis of Large-scale Internet Services," OSDI'14: Proceedings of the 11th USENIX conference on Operating Systems Design and Implementation; Oct. 2014; 16 pages.

Devlin et al., "BERT: Pre-training of Deep Bidirectional Transformers for Language Understanding," arXiv:1810.04805v2 [cs.CL] May 24, 2019; 16 pages.

Du et al., "DeepLog: Anomaly Detection and Diagnosis from System Logs through Deep Learning," CCS '17: Proceedings of the 2017 ACM SIGSAC Conference on Computer and Communications Security; Oct. 2017.

Fonseca et al., "X-Trace: A Pervasive Network Tracing Framework," NSDI'07: Proceedings of the 4th USENIX conference on Networked systems design & implementation; Apr. 2007; 14 pages.

Gan et al., "An Open-Source Benchmark Suite for Microservices and Their Hardware-Software Implications for Cloud & Edge Systems" ASPLOS'19, Apr. 13-17, 2019, Providence, RI, USA, https://dl.acm.org/doi/10.1145/3297858.3304013, 16 pages.

Zhou et al., "Fault Analysis and Debugging of Microservice Systems: Industrial Survey, Benchmark System, and Empirical Study," IEEE Transactions on Software Engineering, vol. 14, No. 8, Aug. 2018; 18 pages.

Hashemi et al. "Learning Memory Access Patterns" arXiv:1803.02329v1 [cs.LG] Mar. 6, 2018, 15 pages.

Bidunmoye et al. "Performance Anomaly Detection and Bottleneck Identification" ACM Computing Surveys, Jul. 2015, Article No. 4, https://doi.org/10.1145/2791120, 35 pages.

"Jaegertracing /jaeger" https://github.com/jaegertracing/jaeger, Last Accessed Nov. 18, 2020, 8 pages.

Jaeger. 2017b. Hot R.O.D.—Rides on Demand. https://github.com/jaegertracing/jaeger/tree/master/examples/hotrod.

Jaegertracing/jaeger-ui https://github.com/jaegertracing/jaeger-ui, Last Accessed, Nov. 18, 2020, 5 pages.

Kaldor et al. "Canopy: An End-to-End Performance Tracing And Analysis System" SOSP '17, Oct. 28, 2017, Shanghai, China, 17 pages.

Lamport "Time, Clocks, and the Ordering of Events in a Distributed System" Communications of the ACM, Jul. 1978, vol. 21, No. 7, 8 pages.

Las-Casas et al. "Sifter: Scalable Sampling for Distributed Traces, without Feature Engineering" SoCC '19, Nov. 20-23, 2019, Santa Cruz, CA, USA, 13 pages.

Liu, et al. "What bugs cause production cloud incidents?" Association for Computing Machinery, HotOS '19, May 13-15, 2019, Bertinoro, Italy, 8 pages.

Lo, et al. "Heracles: Improving Resource Efficiency at Scale" ISCA '15, Jun. 13-17, 2015, Portland, OR, USA, 13 pages.

"Locustio/locust" https://github.com/locustio/locust, Last Accessed Nov. 18, 2020, 4 pages.

Maas, et al. "Learning-based Memory Allocation for C++ Server Workloads" 25th ACM International Conference on Architectural Support for Programming Languages and Operating Systems (ASPLOS) (2020), 16 pages.

Mace et al. "Universal Context Propagation for Distributed System Instrumentation" EuroSys '18, Apr. 23-26, 2018, Porto, Portugal, 18 pages.

Meza et al. "A Large Scale Study of Data Center Network Reliability" IMC '18, Oct. 31-Nov. 2, 2018, Boston, MA, USA, 15 pages.

Mi et al. "(Mostly) Exitless VM Protection from Untrusted Hypervisor through Disaggregated Nested Virtualization" {USENIX} Association, 2020, https://www.usenix.org/conference/usenixsecurity20/presentation/mi}, 18 pages.

Mikolov et al. "Distributed Representations of Words and Phrases and their Compositionality" arXiv:1310.4546, 2013, 9 pages.

Mukherjee et al. "Predicting Video-frames Using Encoder-convlstm Combination" CASSP 2019—2019 IEEE International Conference on Acoustics, Speech and Signal Processing (ICASSP), 5 pages.

Xu et al., "Detecting Large-Scale System Problems by Mining Console Logs," Proceedings of the 26 th International Conference on Machine Learning, Haifa, Israel, 2010; 8 pages.

Nogas et al. "DeepFall—Non-invasive Fall Detection with Deep Spatio-Temporal Convolutional Autoencoders" Journal of Healthcare Informatics Research vol. 4, pp. 50-70(2020), 20 pages.

(56) References Cited

OTHER PUBLICATIONS

"OpenTelemetry—CNCF" https://github.com/open-telemetry/, Last Accessed Nov. 18, 2020, 7 pages.
Pennington et al. "GloVe: GlobalVectorsforWordRepresentation" ACL, Proceedings of the 2014 Conference on Empirical Methods in Natural Language Processing (EMNLP), 12 pages.
"Open Zipkin," https://github.com/openzipkin; 7 pages.
Qu "Smart Monitoring System For Automatic Anomaly Detection and Problem Diagnosis" https://www.usenix.org/sites/default/files/conference/protected-files/srecon15_slides_qu.pdf, 2015, Last Accessed Nov. 18, 2020, 35 pages.
Rehurek et al. "Software Framework for Topic Modelling with Large Corpora" In Proceedings of the LREC 2010 Workshop on New Challenges for NLP Frameworks, 2010, 5 pages.
Reynolds et al. "Pip: Detecting the Unexpected in Distributed Systems" USENIX Association NSDI '06: 3rd Symposium on Networked Systems Design & Implementation, 14 pages.
Shi et al., "Convolutional LSTM Network: A Machine Learning Approach for Precipitation Nowcasting," NIPS'15: Proceedings of the 28th International Conference on Neural Information Processing Systems—vol. 1; Dec. 2015; 9 pages.
Sigelman et al., "Dapper, a Large-Scale Distributed Systems Tracing Infrastructure," Google Technical Report dapper-2010-1, Apr. 2010; 14 pages.
Splunk Solutions, "A Beginner's Guide to Observability," Technical report; 2020; 24 pages.
Tatbul et al., "Precision and Recall for Time Series," arXiv:1803.03639v3 [cs.LG] Jan. 2, 2019; 11 pages.
Thalheim et al., "Sieve: Actionable Insights from Monitored Metrics in Distributed Systems," Middleware '17, Dec. 11-15, 2017, Las Vegas, NV, 14 pages.
Vallis et al., "A Novel Technique for Long-Term Anomaly Detection in the Cloud," 6th {USENIX} Workshop on Hot Topics in Cloud Computing (HotCloud); 2014; 6 pages.
Vasile et al., "Meta-Prod2Vec—Product Embeddings Using Side-Information for Recommendation," arXiv:1607.07326v1 [cs.IR] Jul. 25, 2016; 8 pages.NPL.
Wu et al., "MicroRCA: Root Cause Localization of Performance Issues in Microservices," In NOMS 2020—2020 IEEE/IFIP Network Operations and Management Symposium; 10 pages.
Xu et al., "LogDC: Problem Diagnosis for Declartively-deployed Cloud Applications with Log," 2017 IEEE 14th International Conference on e-Business Engineering (ICEBE); 6 pages.
Shkuro, "Mastering Distributed Tracing," Packt Publishing, 2019, https://www.packtpub.com/product/mastering-distributed-tracing/9781788628464, 27 pages.
International Search Report and Written Opinion received for PCT Application Serial No. PCT/CN2021/123802 dated Jan. 14, 2022, 9 pages.
Nedelkoski et al., "Anomaly Detection from System Tracing Data using Multimodal Deep Learning", 2019 IEEE 12th International Conference on Cloud Computing (CLOUD), Aug. 29, 2019, pp. 179-186.

* cited by examiner

[8389e50a7c1a8c597ef1207ecc9255bd] [2020-04-30T17:47:35.7235Z] [frontend::Recv./cart/checkout | frontend::Sent.hipstershop.CheckoutService.PlaceOrder | checkoutservice::Recv.hipstershop.CheckoutService.PlaceOrder | checkoutservice::Sent.hipstershop.CartService.GetCart | checkoutservice::Sent.hipstershop.ProductCatalogService.GetProduct | productcatalogservice::Recv.hipstershop.ProductCatalogService.GetProduct | checkoutservice::Sent.hipstershop.ProductCatalogService.GetProduct | productcatalogservice::Recv.hipstershop.ProductCatalogService.GetProduct | checkoutservice::Sent.hipstershop.ShippingService.GetQuote | shippingservice::Recv.hipstershop.ShippingService.GetQuote | checkoutservice::Sent.hipstershop.PaymentService.Charge | checkoutservice::Sent.hipstershop.ShippingService.ShipOrder | shippingservice::Recv.hipstershop.ShippingService.ShipOrder | checkoutservice::Sent.hipstershop.CartService.EmptyCart | checkoutservice::Sent.hipstershop.EmailService.SendOrderConfirmation | frontend::Sent.hipstershop.RecommendationService.ListRecommendations | frontend::Sent.hipstershop.ProductCatalogService.GetProduct | productcatalogservice::Recv.hipstershop.ProductCatalogService.GetProduct | frontend::Sent.hipstershop.ProductCatalogService.GetProduct | productcatalogservice::Recv.hipstershop.ProductCatalogService.GetProduct | frontend::Sent.hipstershop.ProductCatalogService.GetProduct | productcatalogservice::Recv.hipstershop.ProductCatalogService.GetProduct | frontend::Sent.hipstershop.ProductCatalogService.GetProduct | productcatalogservice::Recv.hipstershop.ProductCatalogService.GetProduct | frontend::Sent.hipstershop.CurrencyService.GetSupportedCurrencies |]

A: frontend-additem
B: catalog-getproduct
C: cart-additem
D: currency-convert
E: frontend-checkout
F: checkout-placeorder
G: Payment-charge
FIG. 6
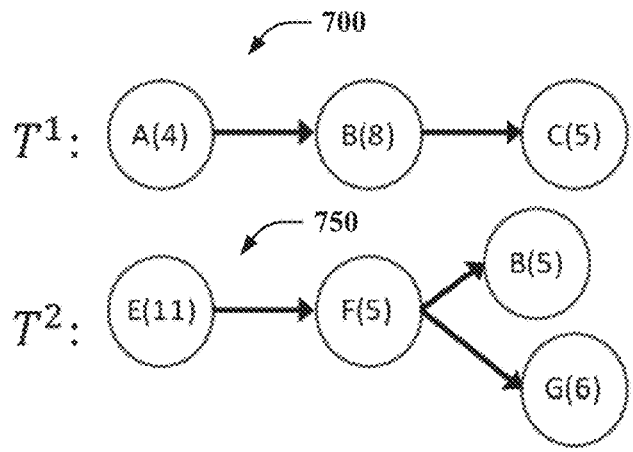
FIG. 7
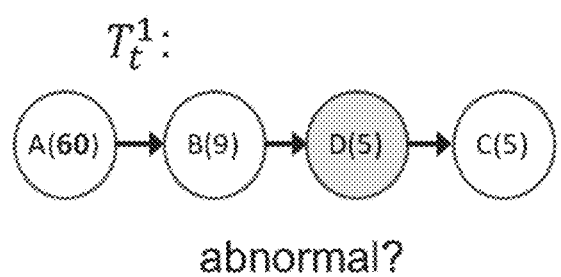
FIG. 8
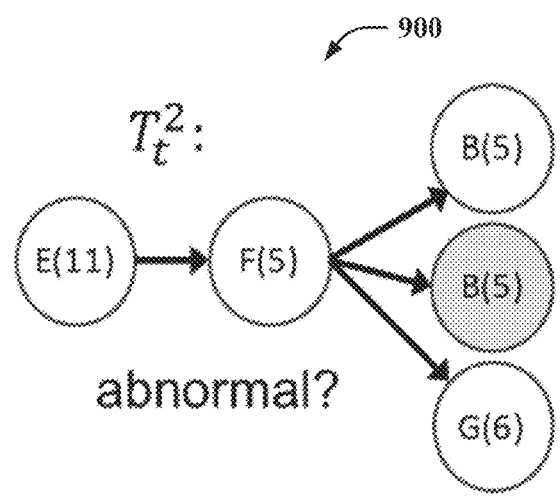
FIG. 9

| | Metric | Precision | | | | | Recall | | | | | F score | | | | | Acc |
|---|---|---|---|---|---|---|---|---|---|---|---|---|---|---|---|---|---|
| | Anomaly type | IA-1 | IA-2 | IA-3 | IA-4 | IA-5 | IA-1 | IA-2 | IA-3 | IA-4 | IA-5 | IA-1 | IA-2 | IA-3 | IA-4 | IA-5 | Avg | IA-0 |
| Ride Sharing App | utilization | 0.18 | 0.57 | 0.33 | 0.40 | 0.31 | 0.67 | 0.23 | 0.61 | 0.72 | 0.23 | 0.24 | 0.31 | 0.42 | 0.53 | 0.24 | 0.35 | 0.90 |
| | tr-PCA | 0.43 | 0.56 | 0.66 | 0 | 0.30 | 0.22 | 0.68 | 0.52 | 0 | 0.36 | 0.32 | 0.63 | 0.54 | 0 | 0.31 | 0.36 | 0.89 |
| | tr-ED | 0.48 | 0.63 | 0.26 | 0.42 | 0.61 | 0.36 | 0.59 | 0.24 | 0.51 | 0.57 | 0.44 | 0.61 | 0.24 | 0.46 | 0.59 | 0.47 | 0.92 |
| | tr-LED | 0.70 | 0.78 | 0.53 | 0.62 | 0.87 | 0.63 | 0.72 | 0.49 | 0.58 | 0.92 | 0.65 | 0.75 | 0.51 | 0.60 | 0.89 | 0.68 | 0.95 |
| | DT-no-s2v | 0.97 | 0.97 | 0.96 | 0.95 | 0.94 | 0.99 | 0.99 | 0.35 | 0.45 | 0.87 | 0.98 | 0.97 | 0.52 | 0.54 | 0.93 | 0.79 | 0.97 |
| | DT-LSTM | 0.98 | 0.92 | 0.68 | 0.71 | 0.92 | 0.99 | 0.83 | 0.56 | 0.48 | 0.86 | 0.99 | 0.94 | 0.60 | 0.59 | 0.89 | 0.80 | 0.97 |
| | DeepTrace | 0.98 | 0.98 | 0.98 | 0.97 | 0.98 | 0.99 | 0.99 | 0.99 | 0.76 | 0.99 | 0.98 | 0.99 | 0.99 | 0.86 | 0.98 | 0.96 | 0.97 |
| E-commerce App | utilization | 0.10 | 0.61 | 0.48 | 0.37 | 0.49 | 0.16 | 0.30 | 0.29 | 0.58 | 0.43 | 0.12 | 0.39 | 0.37 | 0.38 | 0.44 | 0.34 | 0.91 |
| | tr-PCA | 0.45 | 0.46 | 0.56 | 0.42 | 0.36 | 0.36 | 0.52 | 0.50 | 0.42 | 0.35 | 0.31 | 0.49 | 0.52 | 0.42 | 0.36 | 0.42 | 0.93 |
| | tr-ED | 0.91 | 0 | 0.65 | 0 | 0.57 | 0.73 | 0 | 0.52 | 0 | 0.36 | 0.75 | 0 | 0.59 | 0 | 0.32 | 0.33 | 0.93 |
| | tr-LED | 0.72 | 0.77 | 0.80 | 0.58 | 0.87 | 0.48 | 0.69 | 0.64 | 0.71 | 0.76 | 0.63 | 0.61 | 0.71 | 0.63 | 0.82 | 0.68 | 0.82 |
| | DT-no-s2v | 0.89 | 0.93 | 0.94 | 0.90 | 0.94 | 0.97 | 0.78 | 0.51 | 0.84 | 0.78 | 0.93 | 0.88 | 0.67 | 0.91 | 0.83 | 0.84 | 0.91 |
| | DT-LSTM | 0.91 | 0.92 | 0.87 | 0.95 | 0.89 | 0.70 | 0.72 | 0.81 | 0.93 | 0.71 | 0.87 | 0.77 | 0.83 | 0.93 | 0.75 | 0.83 | 0.93 |
| | DeepTrace | 0.90 | 0.95 | 0.96 | 0.94 | 0.82 | 0.97 | 0.79 | 0.73 | 0.84 | 0.92 | 0.94 | 0.88 | 0.84 | 0.91 | 0.92 | 0.90 | 0.97 |
| Social Network App | utilization | 0.42 | 0.76 | 0.38 | 0.69 | 0 | 0.26 | 0.29 | 0.34 | 0.41 | 0 | 0.29 | 0.32 | 0.34 | 0.45 | 0 | 0.28 | 0.87 |
| | tr-PCA | 0.59 | 0.41 | 0.44 | 0.37 | 0.41 | 0.30 | 0.25 | 0.42 | 0.36 | 0.31 | 0.37 | 0.28 | 0.42 | 0.36 | 0.40 | 0.37 | 0.94 |
| | tr-ED | 0.31 | 0.43 | 0.23 | 0.39 | 1 | 0.23 | 0.51 | 0.60 | 0.46 | 0 | 0.25 | 0.49 | 0.39 | 0.42 | 0 | 0.31 | 0.90 |
| | tr-LED | 0.43 | 0.67 | 0.74 | 0.65 | 0.27 | 0.57 | 0.83 | 0.80 | 0.74 | 0.43 | 0.49 | 0.73 | 0.81 | 0.69 | 0.33 | 0.61 | 0.92 |
| | DT-no-s2v | 0.95 | 0.81 | 0.92 | 0.81 | 0.89 | 0.65 | 0.76 | 0.41 | 0.78 | 0.37 | 0.70 | 0.76 | 0.58 | 0.79 | 0.49 | 0.66 | 0.92 |
| | DT-LSTM | 0.90 | 0.86 | 0.81 | 0.92 | 0.82 | 0.67 | 0.73 | 0.82 | 0.85 | 0.59 | 0.71 | 0.80 | 0.81 | 0.86 | 0.61 | 0.75 | 0.93 |
| | DeepTrace | 0.94 | 0.89 | 0.87 | 0.85 | 0.89 | 0.89 | 0.76 | 0.89 | 0.87 | 0.70 | 0.89 | 0.86 | 0.87 | 0.93 | 0.82 | 0.87 | 0.95 |

FIG. 20

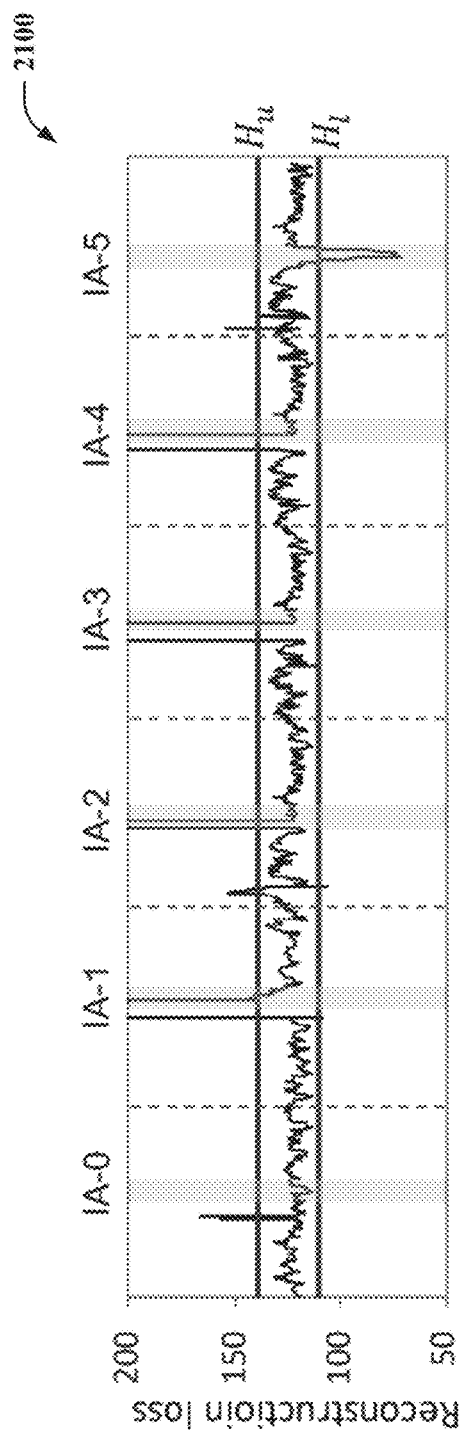
FIG. 21
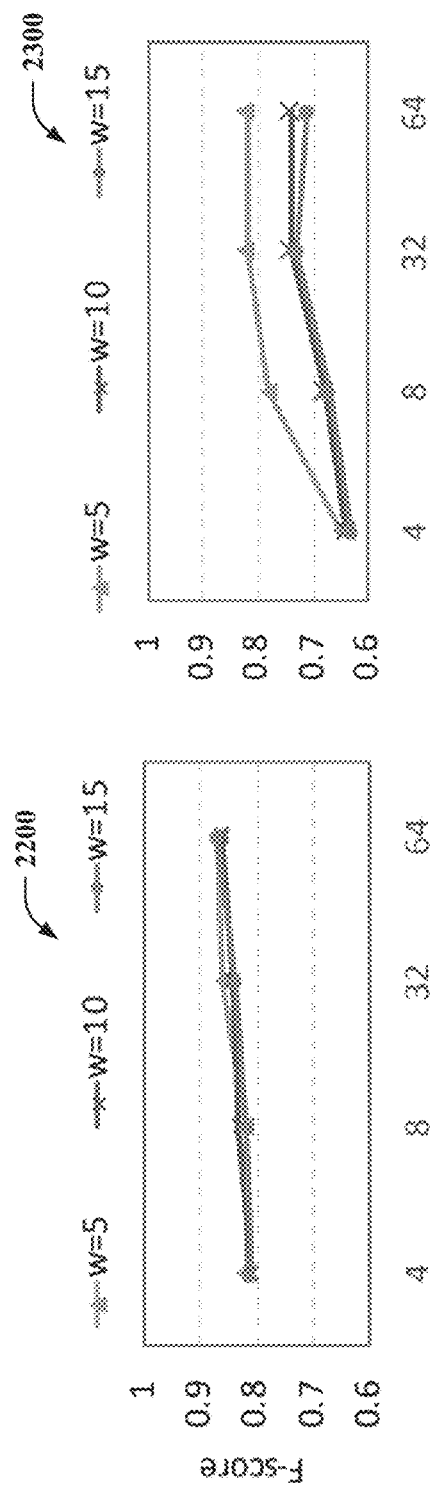
FIG. 22
FIG. 23

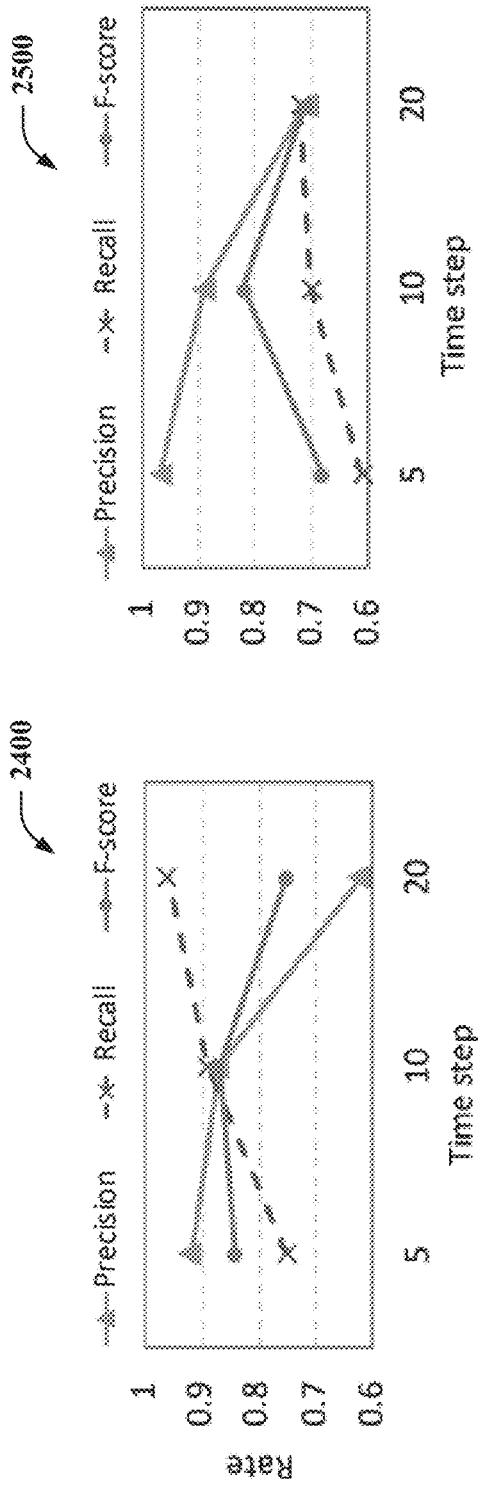

| Anomaly description | Selected top-2 requests/trace types | Selected top-2/3 spans |
|---|---|---|
| Increased latency of message service (IA-1) | 1. Compose message; 2. Load user's timeline | 1. User-timeline, 2. Social graph service 3. Post storage |
| Disabled Mongodb of social graph service (IA-2) | 1. Register new user; 2. Compose message mentioning friends | 1. User-timeline, 2. user-service, 3. Social graph service |
| High packet loss between Usertimeline and its Mongodb (IA-3) | 1. Load user's timeline; 2. Compose message | 1. User-timeline, 2. Post storage |
| Corrupted cache data of Homeline service (IA-4) | 1. Load user's home page; 2. Load user's timeline | 1. Home timeline, 2. Social graph service, 3. User-service |
| A surge of user registration request (IA-5) | 1. Register new user; 2. Insert user to social graph service | 1. Social graph service 2. User-service |

FIG. 26

LEARNING FROM DISTRIBUTED TRACES FOR ANOMALY DETECTION AND ROOT CAUSE ANALYSIS

BACKGROUND

The subject disclosure relates to computing devices, and more specifically, to techniques of facilitating anomaly detection and/or root cause analysis using distributed trace data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate anomaly detection and/or root cause analysis using distributed trace data are described.

According to an embodiment, a system can comprise a processor that executes computer executable components stored in memory. The computer executable components comprise: a preprocessing component; and a monitor component. The preprocessing component can generate a trace frame comprising a vectorized representation of textual trace data produced by microservices of a microservice application. The monitor component can identify a state of the microservice application using the trace frame.

According to another embodiment, a computer-implemented method can comprise generating, by a system operatively coupled to a processor, a trace frame comprising a vectorized representation of textual trace data produced by microservices of a microservice application. The computer-implemented method can further comprise identifying, by the system, a state of the microservice application using the trace frame.

According to another embodiment, a computer program product can comprise a computer readable storage medium having program instructions embodied therewith. The program instructions are executable by a processor to cause the processor to perform operations. The operations can include generating, by the processor, a trace frame comprising a vectorized representation of textual trace data produced by microservices of a microservice application. The operations can further include identifying, by the processor, a state of the microservice application using the trace frame.

DESCRIPTION OF THE DRAWINGS

FIG. 4 illustrates example, non-limiting textual trace data, in accordance with one or more embodiments described herein.

FIG. 6 illustrates an example, non-limiting list of span names, in accordance with one or more embodiments described herein.

FIG. 7 illustrates example, non-limiting directed acyclic graphs (DAGs) depicting traces of a microservice application, in accordance with one or more embodiments described herein.

FIG. 8 illustrates an example, non-limiting DAG depicting a variant trace of a microservice application, in accordance with one or more embodiments described herein.

FIG. 9 illustrates an example, non-limiting DAG depicting another variant trace of a microservice application, in accordance with one or more embodiments described herein.

FIG. 20 illustrates an example, non-limiting table depicting results of an example demonstration, in accordance with one or more embodiments described herein.

FIG. 21 illustrates an example, non-limiting graph depicting reconstruction loss with respect to time, in accordance with one or more embodiments described herein.

FIG. 22 illustrates an example, non-limiting graph depicting the effects of varying embedding dimension (c) and a size of context window (w) with respect to the IA-3 injected anomaly, in accordance with one or more embodiments described herein.

FIG. 23 illustrates an example, non-limiting graph depicting the effects of varying embedding dimension d and a size of context window w with respect to the IA-5 injected anomaly, in accordance with one or more embodiments described herein.

FIG. 24 illustrates an example, non-limiting graph depicting the effects of varying time step length λ with respect to the IA-3 injected anomaly, in accordance with one or more embodiments described herein.

FIG. 25 illustrates an example, non-limiting graph depicting the effects of varying time step length λ with respect to the IA-5 injected anomaly, in accordance with one or more embodiments described herein.

FIG. 26 illustrates an example, non-limiting table depicting diagnosis performances of an example demonstration, in accordance with one or more embodiments described herein.

DETAILED DESCRIPTION

Figure 1:
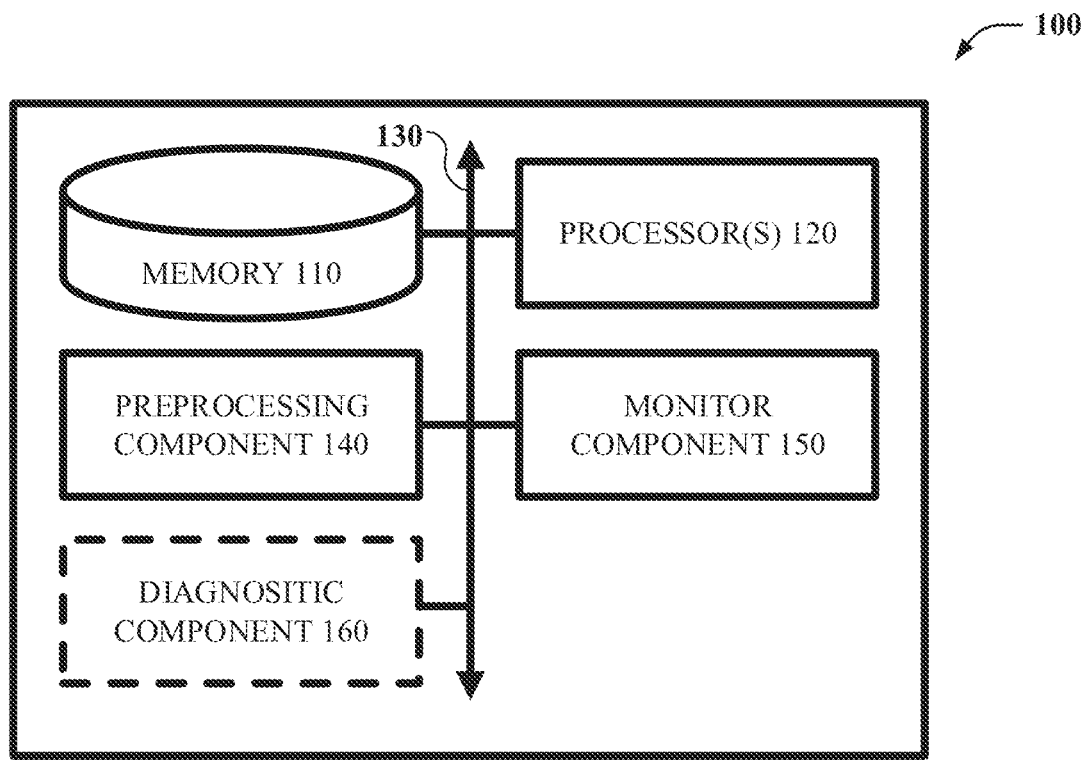
FIG. 1 illustrates a block diagram of an example, non-limiting system that can facilitate anomaly detection and/or root cause analysis using distributed trace data, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Microservice architectures are increasingly gaining popularity when designing software applications as they enable developers to operate on independent schedules and deliver with high speed, thereby shortening time-to-market. With respect to applications deployed in hybrid cloud environments, microservice architectures are particularly appealing because the loosely coupled components of a microservice application offer improved scalability, flexibility, maintainability, and accelerated developer productivity. As a result, many companies have been switching from traditional monolithic designs to microservice architectures. Maintaining the health status of a microservice application has become a challenge for the information technology (IT) professionals, such as DevOps and site reliability engineers (SREs). However, existing anomaly detection and root cause analysis (RCA) approaches designed for monolithic systems can be ineffective for use with microservice applications.

To effectively deal with the large number of microservices comprising a micro application, DevOps and SREs often focus on measuring and monitoring application or system metrics (e.g., central processing unit (CPU) usage, remote procedure call (RPC) latency, and the like) that are believed to accurately reflect the status of a micro application. However, the metric-monitoring approaches generally do not scale well when the complexity of the composite services in an application increase. Furthermore, modern cloud native services can be deployed in virtual machine (VM) or container-based clusters where multiple virtualization layers and hardware heterogeneity can make it hard to identify the key metrics of healthy services. Also, the number of RPCs for a single microservice can range from one or a few RPCs to hundreds of RPCs. These microservices form a perplexing service mesh for the application and so the monitoring results from either aggregated or separate metrics that heavily rely on the workloads can make such metrics ill-suited for RCA on detected anomalies.

In addition to metrics, several monitoring methods have leveraged logs to detect abnormal status, showing good performance against anomalies with reasonable diversity. Such log-based methods first parse unstructured logs into a structured format and then group them for distinct tasks or threads. Afterwards, log-based methods can build statistical or machine learning models on logs of good behavior and detect anomalies associated with new logs by calculating the deviation from the good pattern. However, such log-based methods have difficulty handling the complicated concurrency patterns imposed by microservices which can result in deteriorated accuracy of the trained models. Therefore, the problem of detecting and diagnosing anomaly for microservice applications remains largely unresolved.

Unlike metrics and logs centering around a single service or component, a trace—being one of three pillars of IT observability—offers a comprehensive view of a distributed system. Distributed traces can be assembled by causally related events produced at tracing points across process boundaries. As such, distributed traces can help developers troubleshoot subtle software bugs, find performance bottlenecks, and understand resource usage of large-scale distributed systems. However, utilizing distributed traces for anomaly detection and RCA is challenging for a number of reasons. For example, as trace events contain heterogeneous content in both textual and numerical format, simply applying word embeddings to the raw textual data generally cannot capture the full set of relationships between these events in the trace context. As another example, learning the features of normal traces involves not only modeling the dependencies in the sequence of events within a single trace, but also the more complex dependencies across traces.

FIG. 1 illustrates a block diagram of an example, non-limiting system 100 that can facilitate anomaly detection and/or root cause analysis using distributed trace data, in accordance with one or more embodiments described herein. System 100 includes memory 110 for storing computer-executable components and one or more processors 120 operably coupled via one or more communication busses 130 to memory 110 for executing the computer-executable components stored in memory 110. As shown in FIG. 1, the computer-executable components include: preprocessing component 140; and monitor component 150.

Preprocessing component 140 can generate a trace frame comprising a vectorized representation of textual trace data produced by microservices of a microservice application. In an embodiment, the preprocessing component can generate the trace frame with a machine learning model trained using a graph traversal algorithm, a word embedding technique, or a combination thereof.

Monitor component 150 can identify a state of the microservice application using the trace frame. In an embodiment, the monitor component can identify the state of the microservice application by comparing the trace frame with a reconstructed trace frame generated by a machine learning model. In an embodiment, the machine learning model can capture spatial and temporal dependencies between the microservices of the microservice application when operating in a normal state.

In an embodiment, the monitor component can identify the state of the microservice application by comparing a sequence of trace frames with a sequence of reconstructed trace frames generated by a machine learning model. The sequence of trace frames can comprise the trace frame. In an embodiment, the machine learning model can be a convolutional long short term memory (ConvLSTM)-based autoencoder model.

In an embodiment, the computer-executable components stored in memory 110 can further include diagnostic component 160. Diagnostic component 160 can perform RCA by evaluating a contribution of each microservice to a given reconstruction loss. The functionality of the computer-executable components utilized by the embodiments will be covered in greater detail below.

Figure 2:
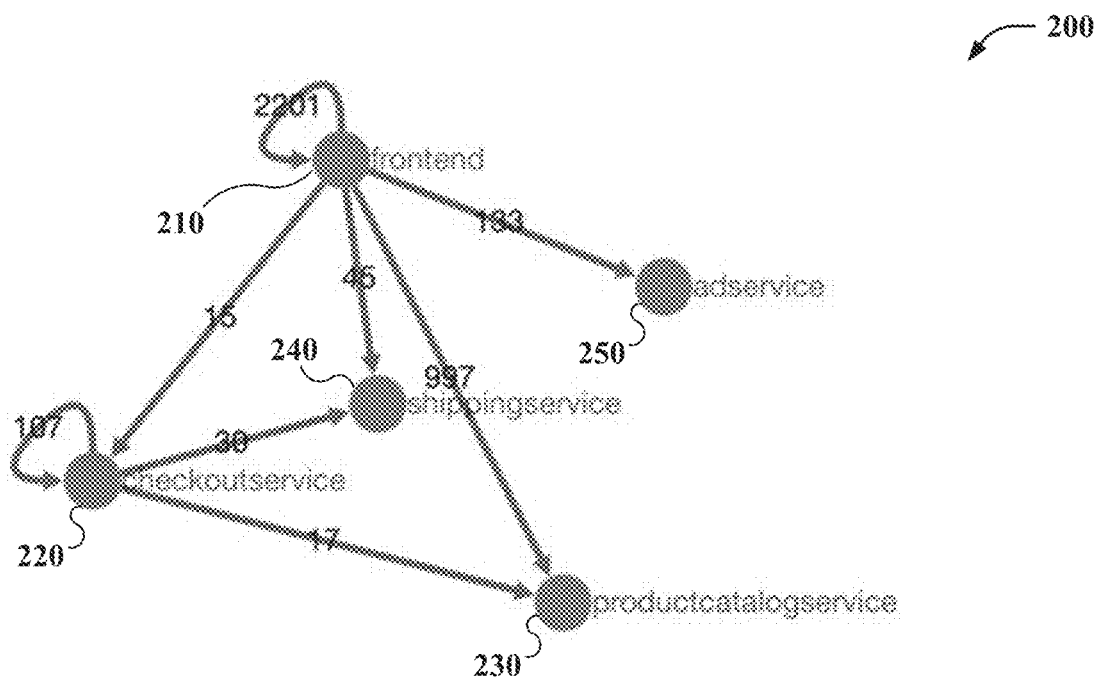
FIG. 2 illustrates an example, non-limiting dependency graph depicting dependencies between microservices of an e-commerce microservice application, in accordance with one or more embodiments described herein.

FIG. 2 illustrates an example, non-limiting dependency graph 200 depicting dependencies between microservices of an e-commerce microservice application, in accordance with one or more embodiments described herein. As shown by FIG. 2, the e-commerce microservice application is structured as a loosely-coupled collection of small, well-defined stateless services known as microservices. In FIG. 2, the loosely-coupled collection of microservices includes: a frontend microservice 210; a checkout microservice 220; a product catalog microservice 230; a shipping microservice 240; and an advertisement microservice 250. Each microservice includes a well-defined application programming interface (API) via which the loosely-coupled collection of microservices communicate to generate responses to requests that users trigger from frontend microservice 210 of the e-commerce microservice application.

Figure 3:
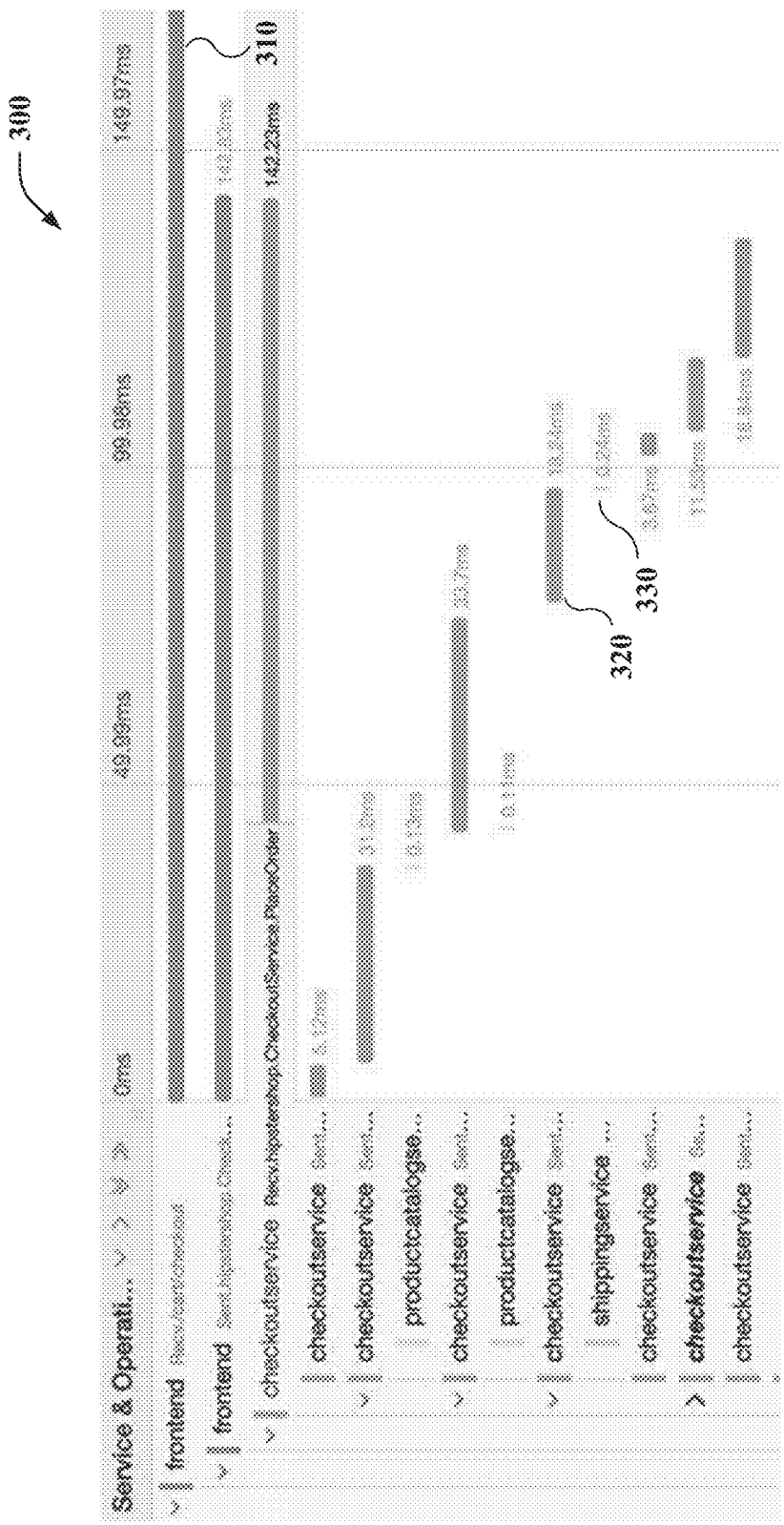
FIG. 3 illustrates an example, non-limiting Gantt chart depicting a trace, in accordance with one or more embodiments described herein.

FIG. 3 illustrates an example, non-limiting Gantt chart 300 depicting a trace, in accordance with one or more embodiments described herein. As used herein for microservice applications, a "trace" refers to an end-to-end execution flow of processing one request triggered by a user from a frontend microservice (e.g., web UI) to a backend microservice (e.g., a database), including all intermediate microservices. In FIG. 3, the trace depicted by Gantt chart 300 corresponds to a single checkout request triggered by a user from a frontend microservice. By definition, an end-to-end execution flow of a trace is a composite of spans and their causal ordering. A "span" refers to a named operation with a set of attributes (e.g., duration, host/process identifier (ID)) to describe a single unit of the end-to-end execution flow. As shown by FIG. 3, a trace can be composed of operations on multiple microservices. For example, the trace depicted by Gantt chart 300 is composed of operations on a frontend microservice, a checkout microservice, a product catalog microservice, and a shipping microservice. A span can often refer to other spans, forming a happened-before causal ordering. For example, a span that refers to another span preceding the span in the end-to-end execution flow can be called a child span. In this example, the other span that precedes the child span in the end-to-end execution flow can be called a parent span. Spans 320 and 330 of Gantt chart 300 represent a parent span and a child span, respectively. A span without a parent span can be called a root span. Span 310 of Gantt chart 300 represents a root span.

FIG. 4 illustrates example, non-limiting textual trace data 400, in accordance with one or more embodiments described herein. Textual trace data 400 generally represents a textual view of the trace depicted by Gantt chart 300 that corresponds to the checkout request. As shown by FIG. 4, textual trace data 400 includes a trace ID 410 and a start time 420 of an earlier span. Textual trace data 400 further includes an array of spans comprising the trace depicted by Gantt chart 300, such as span 430 and span 440. In FIG. 4, the array of spans is sorted by start time and intervening between adjacent spans in the array of spans is a double vertical line symbol "||". Each span in textual trace data 400 includes a microservice name and an operation name separated by a double semicolon symbol "::". The operation name references an operation being performed and the microservice name references a microservice of the e-commerce microservice application that is performing the operation. For example, span 430 includes a microservice name of "frontend" and an operation name of "Sent.hipstershop.CheckoutService.PlaceOrder". As another example, span 440 includes a microservice name of "productcatalogservice" and an operation name of "Recv.hipstershop. ProductCatalogService.GetProduct".

Figure 5:
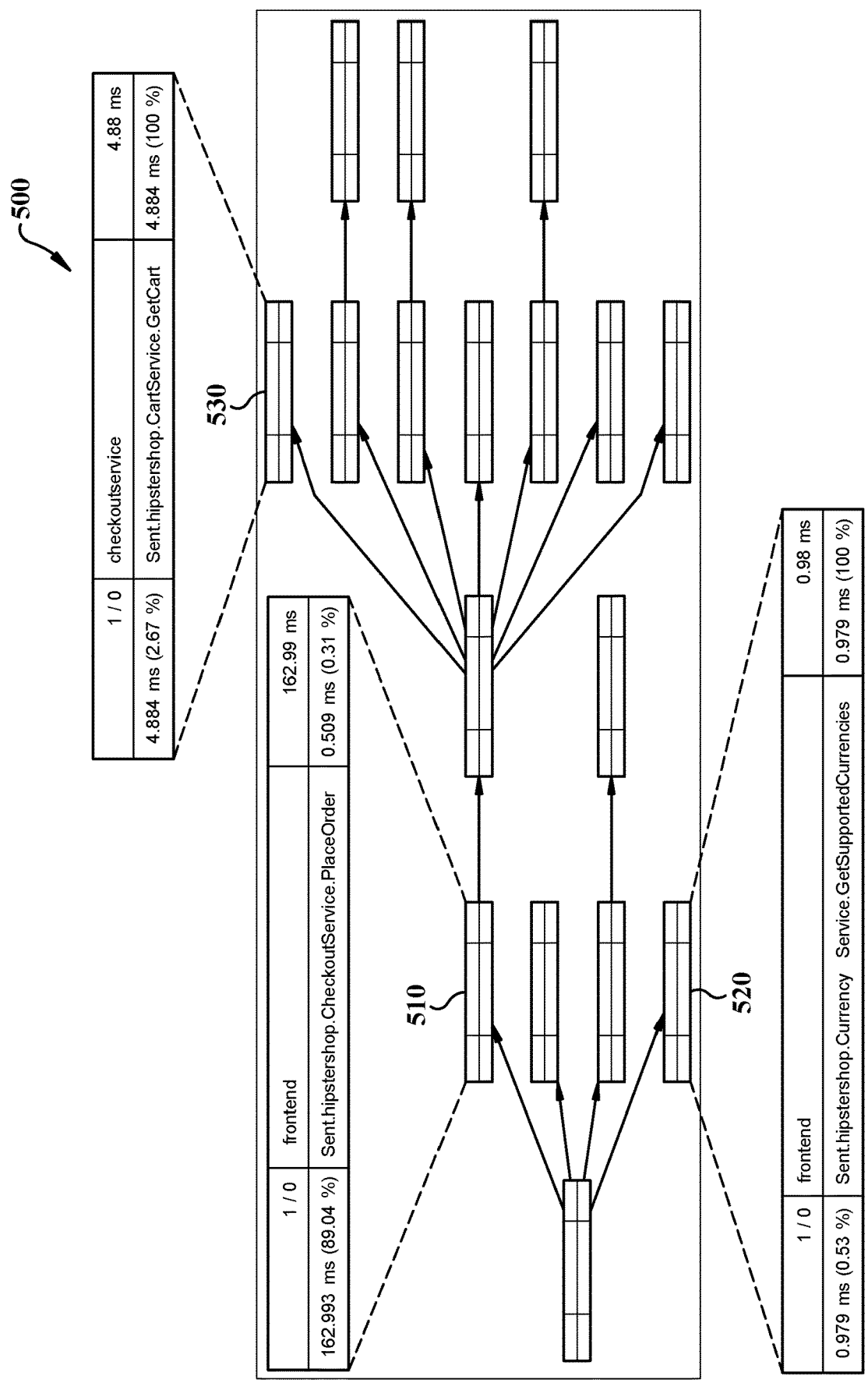
FIG. 5 illustrates an example, non-limiting call graph depicting a trace, in accordance with one or more embodiments described herein.

FIG. 5 illustrates an example, non-limiting call graph 500 depicting a trace, in accordance with one or more embodiments described herein. In particular, call graph 500 represents the trace depicted by Gantt chart 300 that corresponds to the checkout request. Each node of call graph 500 represents an operation performed by a microservice of the e-commerce microservice application. For example, node 510 represents a "Sent.hipstershop. CheckoutService.PlaceOrder" operation performed by a frontend microservice of the e-commerce microservice application that corresponds to span 430 of textual trace data 400. As illustrated by FIG. 5, each node of call graph 500 includes a number of attributes of the operation represented by that node, such as duration, CPU utilization, memory utilization, and the like. For example, node 530 indicates that a duration of the "Sent.hipstershop. CartService.GetCart" operation performed by a checkout microservice of the e-commerce microservice application was 4.8 milliseconds (ms). FIG. 5 further illustrates that some microservices of the e-commerce microservice application can perform multiple operations within the end-to-end execution flow in processing the checkout request. For example, the "Sent.hipstershop-.CheckoutService.PlaceOrder" and "Sent.hipstershop.CurrencyService. GetSupportedCurrencies" operations represented by nodes 510 and 520, respectively, are each performed by the frontend microservice of the e-commerce microservice application.

FIG. 7 illustrates example, non-limiting directed acyclic graphs (DAGs) depicting traces, in accordance with one or more embodiments described herein. In FIG. 7, traces are formed by named spans and depicted as DAGs according to a causal ordering of the named spans. Specifically, the DAGs of FIG. 7 include a DAG 700 depicting a trace ($T^1$) of an add item to shopping cart request and a DAG 750 depicting a trace ($T^2$) of a checkout request. As shown by FIG. 7, trace $T^1$ comprises three named spans from the list of span names 600 illustrated by FIG. 6. Those three named spans include: (i) frontend-additem span A; (ii) catalog-getproduct span B; and (iii) cart-additem span C. DAG 700 depicts a causal ordering of the three named spans comprising trace $T^1$ as frontend-additem span A being followed by catalog-getproduct span B, which is followed by cart-additem span C. FIG. 7 further shows that trace $T^2$ comprises four named spans from the list of span names 600. Those four named spans include: (i) frontend-checkout span E; (ii) checkout-placeorder span F; (iii) catalog-getproduct span B; and (iv)

payment-charge span G. DAG 750 depicts a causal ordering of the four named spans comprising trace $T^2$ as frontend-checkout span E being followed by checkout-placeorder span F, which is followed by catalog-getproduct span B and payment-charge span G. Collectively, the combination of named spans and their causal ordering can have strong implications on the program logic as designed by the developers. When a system administrator observes that the trace deviates from its normal shape, the microservice application can be in an abnormal status. Thus, learning trace patterns can be used to determine the application status.

Consider the appearance of a trace at time t as in FIG. 7 and suppose that two variants of traces $T^1$ and $T^2$ can be observed as depicted in DAGs 800 and 900 of FIGS. 8 and 9, respectively. At first glance, trace $T_t^1$ depicted in DAG 800 of FIG. 8 is questionable due to the extra currency-convert span D when compared to trace $T^1$ depicted in DAG 700 of FIG. 7. However, the addition of currency-convert span D in trace $T_t^1$ can correlate to the latency of the prior spans (i.e., frontend-additem span A and catalog-getproduct span B) in the execution flow of trace $T_t^1$. For example, a high latency in frontend-additem span A can be caused by adding an unusual imported item to the shopping cart. As shown by comparison between FIG. 7 and FIG. 8, the latency of frontend-additem span A increased from 4 ms in trace $T^1$ to 60 ms in trace $T_t^1$. That relatively high latency of frontend-additem span A in trace $T_t^1$ can entail converting a price of the unusual imported item to a local currency. Thus, trace $T_t^1$ is normal. This factor can be referred to as intra-request dependency.

FIG. 9 illustrates another factor that can influence the execution flow of a trace. With a model trained by sequences of individual traces, if the training data used to train the model contains more samples of trace $T^2$ depicted in DAG 750 of FIG. 7 than trace $T_t^2$ depicted in DAG 900 of FIG. 9, the model will report trace $T_t^2$ as an anomalous trace. In fact, trace $T_t^2$ is normal and the deviation is caused by previous requests of add items in a shopping cart. For example, when the previous requests have added two items to the shopping cart, it is normal to fetch the product detail (e.g., price, color, size) from the catalog microservice twice to fulfill the checkout request. In other words, the number of catalog-getproduct spans B in trace $T_t^2$ depends on a number of add item requests (e.g., the number of iterations of trace $T^1$) that occur before the checkout request of trace $T_t^2$. This factor is inter-request dependency.

As discussed above, a microservice architecture is appealing for designing applications that are to be deployed in hybrid cloud environments because the loosely coupled components (e.g., microservices) offer various benefits over a monolithic service architecture. Example benefits include better scalability, flexibility, maintainability, accelerated developer productivity, and the like. Anomaly detection and diagnosis can be an important aspect of building reliable and dependable microservice applications. For example, avoiding service-level agreement (SLA) violations and potential corresponding impacts involves effectively and efficiently detecting anomalies so that IT professionals (e.g., DevOps and/or SREs) can take further actions to resolve the underlying problems in a timely manner Distributed trace, as a core component of modern cloud native services, provides an excellent source for recognizing anomalous behavior by learning the characteristics of a healthy microservice application. Learning from massive volumes of trace data that is generally associated with microservice applications can be challenging because of the heterogeneous mixture of textual and numeric values. Additional challenges can arise due to complex dependencies within a single as well as across multiple traces. Existing approaches generally do not consider such spatial and temporal dependencies among microservices that can lead to an increase in false positives.

Embodiments of the present disclosure address the aforementioned challenges by providing a framework that characterizes inter-request and intra-request dependencies in trace data from healthy microservice applications to perform anomaly detection as well as identify a set of root causes. To that end, the following disclosure provides techniques that facilitate anomaly detection and/or RCA in microservice applications based on request contextual data with machine learning models, such as neural networks. As such, embodiments of the present disclosure build machine learning models that can jointly learn the intra-request and inter-request dependencies from normal trace data to effectively detect anomalous behavior by a microservice application.

One aspect of the disclosed framework involves an embedding algorithm that encodes the textual trace events in low-dimensional vector space using neural language model applied to graph traversal on the traces. Word embedding techniques generally convert text into low-dimensional vectors to create representations of words in a low-dimensional space. Such representations can capture the meaning of a word by considering its relationships with other words in a context (e.g., a sentence), with the hypothesis that closer words in the context are statistically more dependent with each other. In natural language processing (NLP), embedding models (e.g., word2vec, GloVe, and BERT) can learn the syntactic and semantic relationship between words in various corpora. Spans in a trace of a microservice application can carry meaning like words in natural language text. As such, embodiments of the disclosed framework can implement an embedding mechanism for the named spans in textual trace data.

Another aspect of the disclosed framework involves a deep learning model for anomaly detection and diagnosis that incorporates intra-request and inter-request dependencies via a convolutional long short term memory (ConvLSTM) encoder. Embodiments of the deep learning model produce a reconstructed input via a ConvLSTM decoder. In an embodiment, a reconstruction loss between an input of a deep learning model and a reconstructed input that is output by the deep learning model embraces the characteristics in the trace data of a healthy application, leading to a certain level of interpretability for anomaly detection and diagnosis.

ConvLSTM networks facilitate time series analysis and sequence modeling tasks, such as precipitation nowcasting and video analysis. ConvLSTM combines the strengths of two neural networks: convolutional neural network (CNN) and long short term memory (LSTM). As a result, ConvLSTM can not only learn temporal correlation within a time series of input, but also spatial correlation across multiple time series. This spatial-temporal analysis enabled by ConvLSTM is applicable to the correlation between spans in a single trace (e.g., intra-request dependency), as well as across multiple traces (e.g., inter-request dependency).

Figure 10:
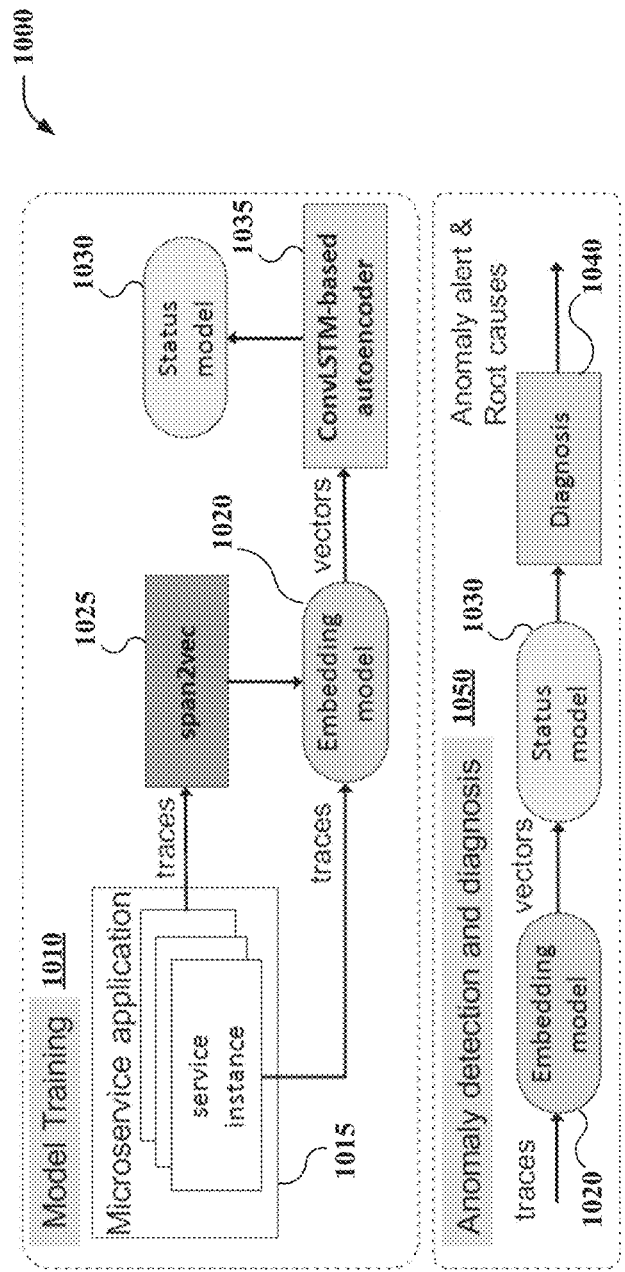
FIG. 10 illustrates an example, non-limiting architecture to implement a framework for detecting anomalous behavior by a microservice application, in accordance with one or more embodiments described herein.

FIG. 10 illustrates an example, non-limiting architecture 1000 to implement a framework for detecting anomalous behavior by a microservice application, in accordance with one or more embodiments described herein. Architecture 1000 includes: a model training stage 1010; and an anomaly detection and diagnosis stage 1050. Model training stage 1010 can build two machine learning models to facilitate capturing intra-request and inter-request dependencies in distributed trace data of a healthy microservice application 1015. As shown by FIG. 10, the two machine learning models built by model training stage 1010 include: an embedding model 1020; and a status model 1030. In model training stage 1010, an embedding algorithm 1025, span2vec, can learn a representation of textual span names in low-dimensional space using a neural language model. With vectorized span names and other span attributes, a ConvLSTM-based autoencoder status model 1030 can be trained in model training stage 1010 using a ConvLSTM-based autoencoder algorithm 1035. In anomaly detection and diagnosis stage 1050, embedding model 1020 and status model 1030 can be used with a diagnosis process 1040 to detect anomalies and/or provide descriptive diagnosis results.

Let $u \in U$ denote a span name and $b \in \mathbb{R}^f$ denote numerical attributes of a span, where U represents the full set of span names of the application and $\mathbb{R}^f$ is a f-dimensional vector. A trace T with n spans can be written as $\{s_i=(u_i,b_i) | 1 \leq i \leq n \wedge u_i \in U \wedge b_i \in \mathbb{R}^f\}$, and the textual part of trace T can be represented using the function defined by Equation 1:

$$\{u_i | 1 \leq i \leq n \wedge u_i \in U\} \quad \text{Equation 1.}$$

If the problem is defined as given the historical data of m traces collected from a healthy application, i.e., $\mathbb{T} = (T_1, \ldots, T_m)$ and the span name set U, the objective can be defined as: (i) detecting anomalous traces after $T_m$; and (ii) identifying spans in anomalous traces that point to root causes.

Figure 11:
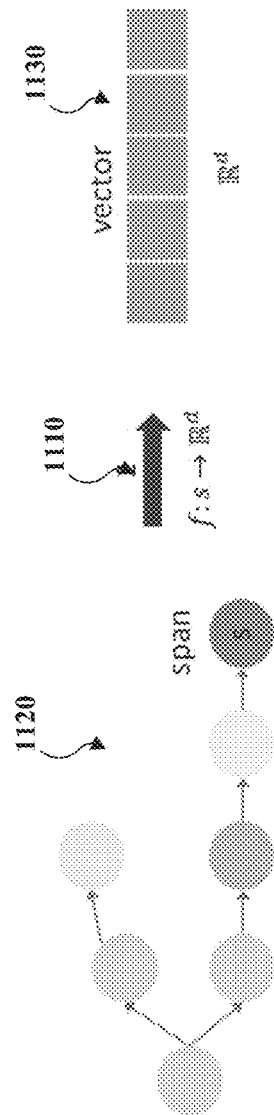
FIG. 11 illustrates an example, non-limiting high-level conceptual overview of finding a d-dimensional vector representing a span of a trace, in accordance with one or more embodiments described herein.

Embodiments of an embedding model output by a span2vec embedding algorithm (span2vec embedding model) can involve learning vector representations of textual span names in $\mathbb{T}$, where the span sequences can be considered as "sentence" and spans within a sequence as "words", borrowing the terminology from NLP. More specifically, given a set of textual representation (e.g., Equation 1) of $T - \mathbb{T}$, the goal of the span2vec embedding model can be defined as finding a d-dimensional vector $v_u \in \mathbb{R}^d$ for span $u \in U$ such that related spans lie nearby in the vector space. An example, non-limiting high-level conceptual overview of that goal of the span2vec embedding model is illustrated by FIG. 11. As shown by FIG. 11, an embodiment of the span2vec embedding model 1110 can receive a DAG 1120 depicting a trace of a microservice application as an input and output a d-dimensional vector embedding each span of the trace.

Building a language model generally involves two inputs: a corpus and a vocabulary V. While it is clear to let V=U, span sequences as defined by Equation 1 cannot be used as the corpus literally. A span sequence of the trace depicted by DAG 1200 of FIG. 12 can be ordered by a respective creation times of each span comprising the trace. In that instance, the span sequence of the trace depicted by DAG 1200 could be (A, B, C, D, E, F). However, that span sequence provides an incomplete representation of span relationships in DAG 1200. For example, the parent-child connection between span D and span F is missing in that span sequence. Furthermore, since the two branches of the trace that forked at B can be run in parallel, the order can become unsettled, which can lead to non-deterministic results.

Figure 12:
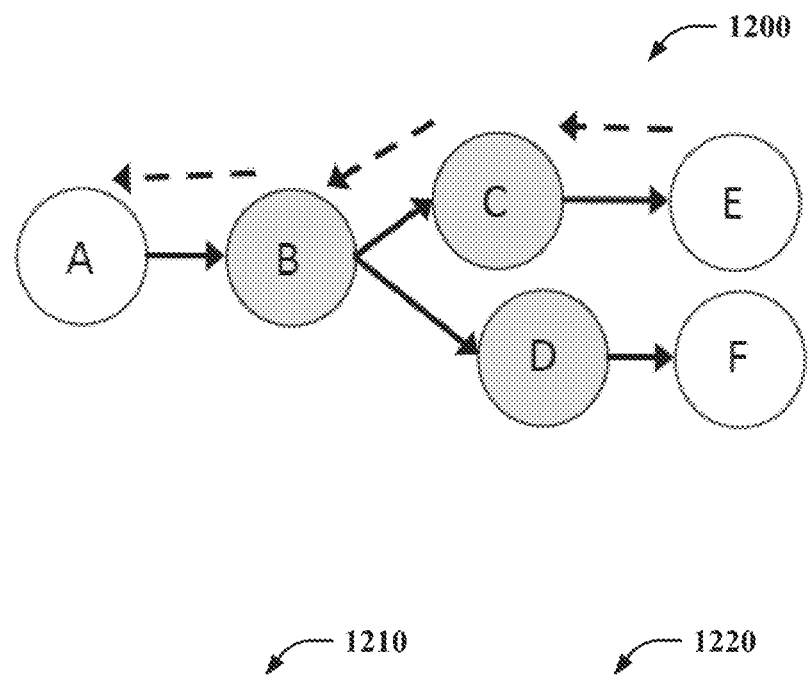
FIG. 12 illustrates an example, non-limiting application of reverse depth-first search (DFS) and 1-hop breadth-first search (BFS) graph traversal algorithms applied to a trace of a microservice application, in accordance with one or more embodiments described herein.

Embodiments of the span2vec embedding model can solve this problem using graph traversal algorithms that take into account both the sequential and parallel relationship between spans in a trace DAG. By way of example, the span2vec embedding model can utilize a combination of a modified depth-first search (DFS) and breadth-first search (BFS) graph traversal algorithms In this example, a reverse-DFS graph traversal algorithm can initialize a span sequence of the trace depicted by DAG 1200 of FIG. 12 with a leaf node (e.g., leaf nodes E and D of DAG 1200) and recursively adding its parent node to the span sequence until the reverse-DFS graph traversal algorithm encounters a root node (e.g., root node A). An operation of the reverse-DFS graph traversal algorithm is represented in FIG. 12 by the dashed arrows. FIG. 12 illustrates an example, non-limiting output 1210 of the reverse DFS graph traversal algorithm applied to the trace depicted by DAG 1200. Then, for each node of DAG 1200 with more than two child nodes, a 1-hop BFS graph traversal algorithm can initialize a new span sequence with that node being a first element and concatenate all child nodes of that node to the new span sequence. The nodes of DAG 1200 that are involved in this application of the 1-hop BFS graph traversal algorithm are represented by shaded vertices in FIG. 12. FIG. 12 further illustrates an example, non-limiting output 1220 of the 1-hop BFS graph traversal algorithm applied to the trace depicted by DAG 1200.

Figure 13:
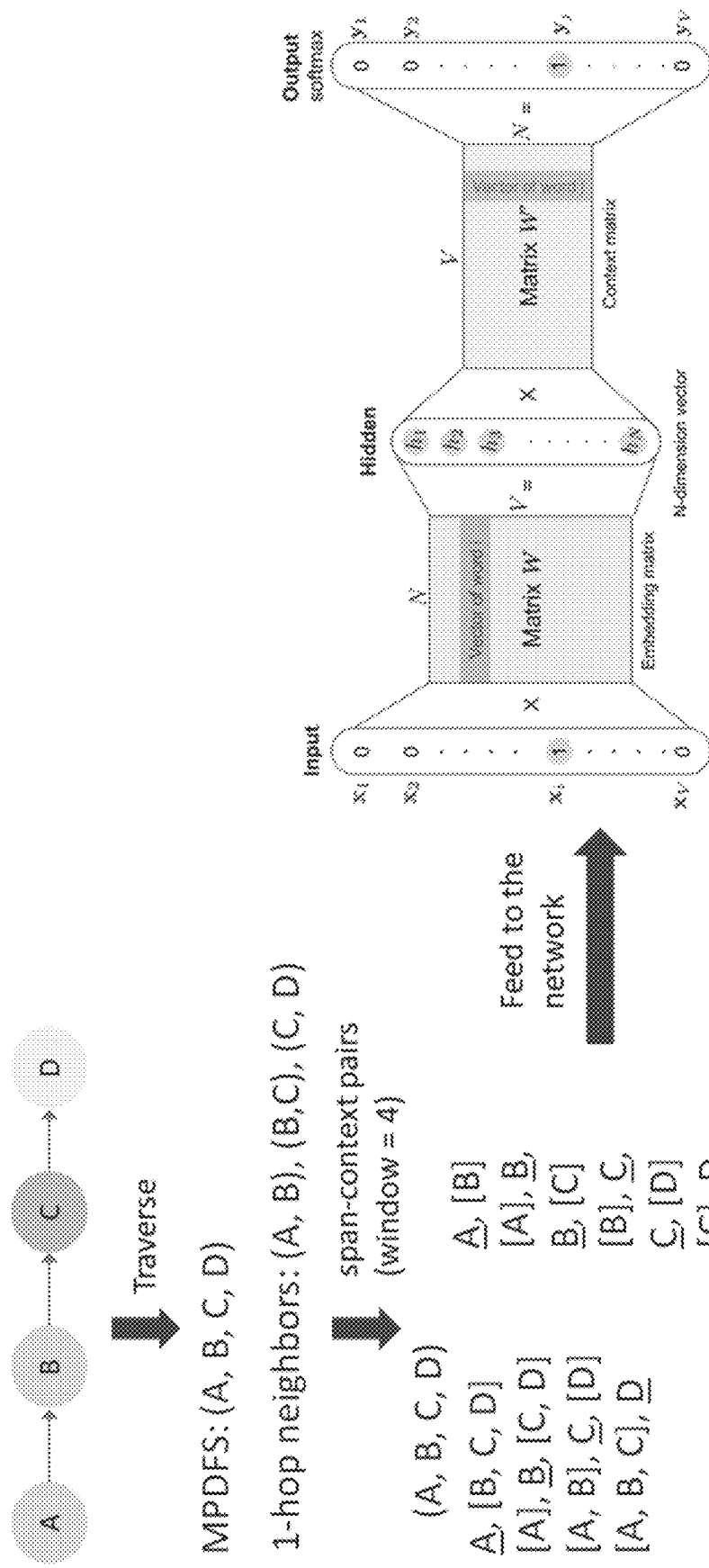
FIG. 13 illustrates an example, non-limiting application of multipath DFS (MPDFS) and 1-hop BFS graph traversal algorithms to a trace of a microservice application, in accordance with one or more embodiments described herein.
Figure 14:
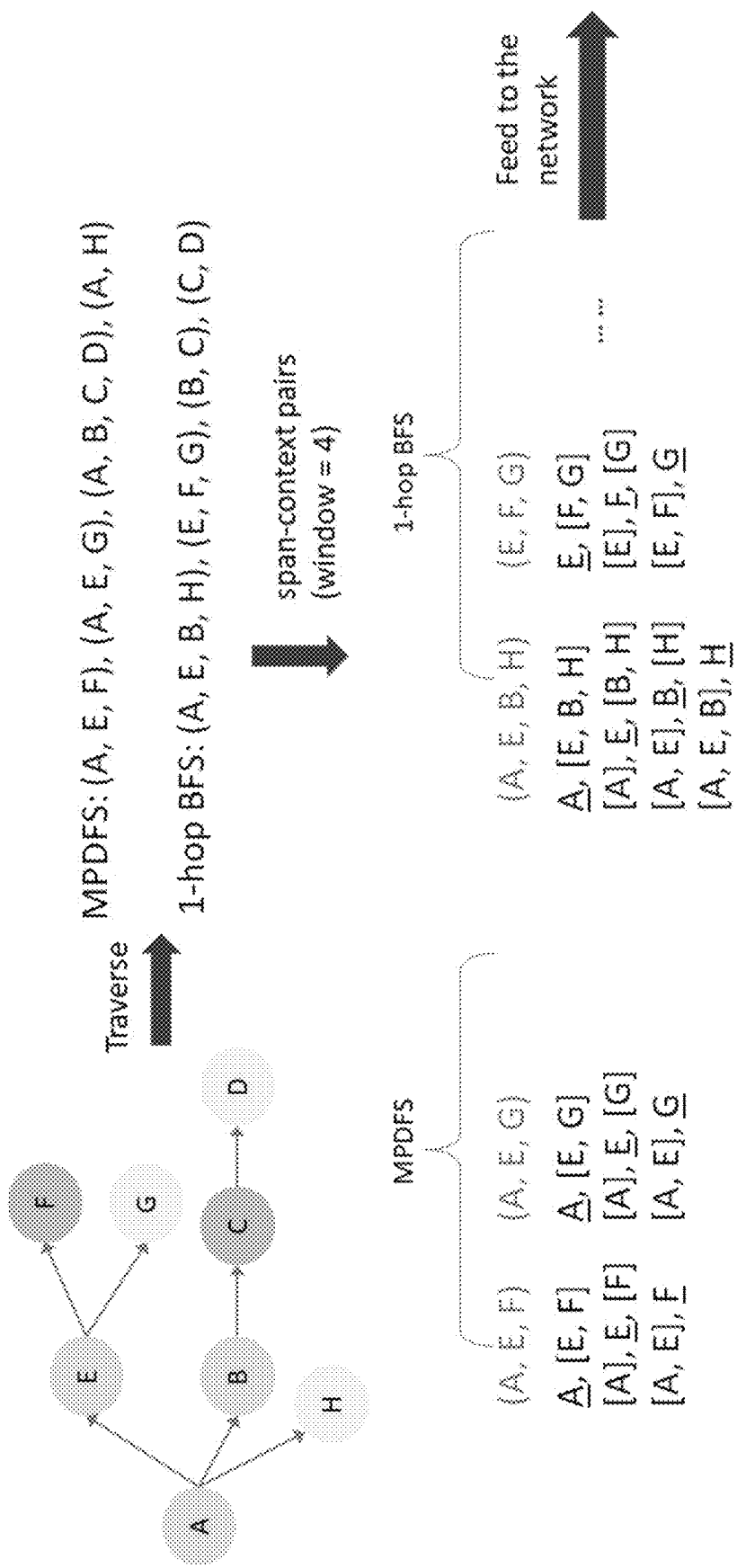
FIG. 14 illustrates another example, non-limiting application of MPDFS and 1-hop BFS graph traversal algorithms to a trace of a microservice application, in accordance with one or more embodiments described herein.

FIG. 13 illustrates an example, non-limiting application of multipath DFS (MPDFS) and 1-hop BFS graph traversal algorithms to a trace of a microservice application, in accordance with one or more embodiments described herein. FIG. 14 illustrates another example, non-limiting application of MPDFS and 1-hop BFS graph traversal algorithms to a trace of a microservice application, in accordance with one or more embodiments described herein. An embedding algorithm (e.g., embedding algorithm 1025 of FIG. 10) can build a span vocabulary from an input trace set $\mathbb{T}$ to generate a sequence for each trace comprising the input trace set $\mathbb{T}$, as illustrated by FIGS. 13-14. The embedding algorithm can then build a DAG (or call graph) for creating span-context sequences as input to generate an embedding of textual trace data. Each node in the DAG can represent a span (or operation on a microservice that has one or more features such as duration. An edge between two nodes in a DAG can indicate a call relationship between two operations represented by the two nodes. Based on the DAG, the embedding algorithm can generate a sequence of spans for each node in the DAG, which can be similar to words in NLP. In order to maintain the logical relationship (e.g., semantics in NLP), the example embedding algorithm can traverse the DAG using the two strategies shown in FIGS. 13-14: MPDFS and 1-hop BFS graph traversal algorithms The embedding algorithm can feed the span-context sequences to a skip-gram network and can extract a hidden layer as embedding weights.

In an embodiment, an embedding matrix for a vocabulary V to build a language model can be generated using Algorithm 1:

---

Algorithm 1: span2vec($\mathbb{T}$, V, d, w)

---

Input: $\mathbb{T}$: traces;
      V: full set of span name;
      d: embedding size;
      w: context window size;
Output: Embedding matrix $\Phi \in \mathbb{R}^{|V| \times d}$
Var: X: a corpus holding sequences of spans;
    T: a single trace;
    E: the references set derived from trace T -continued Algorithm 1: span2vec(T, V, d, w)

```
1 for T ∈ T do
2 |   Build DAG, GT = (v, e), v ∈ V, e ∈ E:
3 |   X ← reverse-DFS(GT):
4 |_  X ← 1-hop BFS(GT):
5 Φ ← embedding_model(X, d, w) :
```

Algorithm 1.

As shown above, Algorithm 1 can output an embedding matrix for a vocabulary V based on an input comprising a trace set $\mathbb{T}$, a vocabulary V of span names, and two embedding parameters: d and w. In a loop, Algorithm 1 can iterate over all traces in the trace set $\mathbb{T}$. For each trace T, Algorithm 1 can first build a DAG, wherein vertices are span names and edges are the parent-child references between spans (e.g., Line 2 of Algorithm 1). Subsequently, Algorithm 1 can run reverse-DFS and 1-hop BFS graph traversal algorithms on the DAG and append the sequences to the corpus X (e.g., Lines 3-4 of Algorithm 1). In this embodiment, Algorithm 1 can use a neural language toolkit (e.g., genism) to generate the embedding model for the span vocabulary V (e.g., Line 5 of Algorithm 1). The effect of embedding dimension (d) and a size of context window (w) input parameters will be evaluated in greater detail below with respect to FIGS. 22-23.

Figure 15:
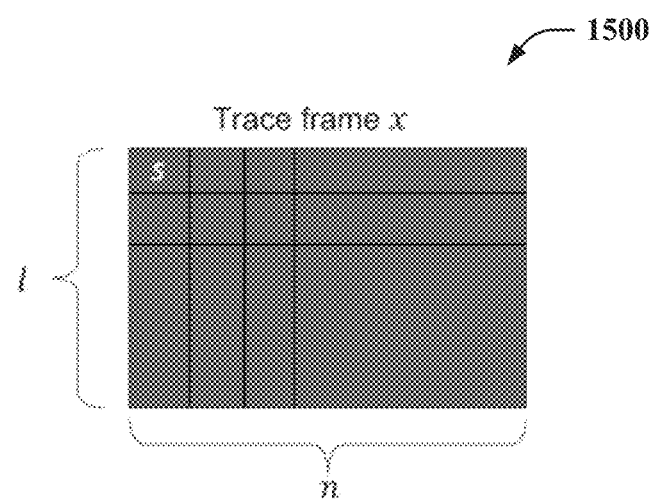
FIG. 15 illustrates an example, non-limiting trace frame, in accordance with one or more embodiments described herein.

Having learned the vectorized span representation, the following disclosure describes input data preparation and an application status model (e.g., status model 1030 of FIG. 10) to learn the dependencies in the traces of a healthy microservice application using historical trace data $\mathbb{T}$. First, the historical trace data $\mathbb{T}$ can be divided into a row of trace frames, such as example, non-limiting trace frame 1500 of FIG. 15. FIG. 15 shows that trace frame 1500 can be formed by l traces and all traces can be padded or truncated to have n spans. After embedding (e.g., by the span2vec embedding model), a textual span name can be represented by a d-dimensional vector and can be concatenated with other numerical attributes, so the representation of a trace with n spans becomes:

$$T = \{s_i^T | 1 \leq i \leq n \wedge s_i \in \mathbb{R}^{(d+f)}\},\qquad\text{Equation 2.}$$

In Equation 2, f is the dimension of a span's numeric attributes. Given Equation 2, a trace frame x can be written as defined by Equation 3:

$$x = \{T_i^x | 1 \leq i \leq l \wedge T_i^x \in \mathbb{R}^{n \times (d+f)}\}\qquad\text{Equation 3.}$$

In accordance with Equation 3, trace frame 1500 can be a matrix constructed from the historical trace data $\mathbb{T}$ that can characterize a status of a microservice application. Each row of trace frame 1500 represents a trace of the microservice application and each column of trace frame 1500 represents a span of a trace. Each element of the matrix formed by trace frame 1500 is a d-dimensional vector embedding of a given span. To the extent that trace frame 1500 includes l traces, [|$\mathbb{T}$|/l] trace frames can be formed from the historical trace data $\mathbb{T}$ in total.

Figure 16:
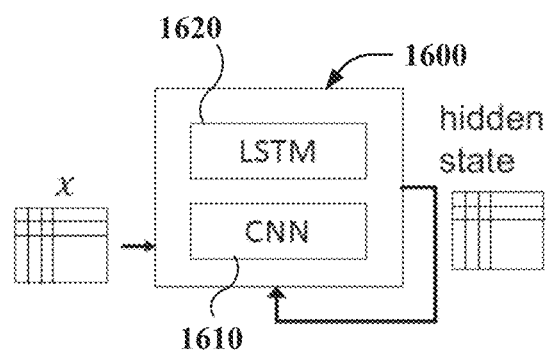
FIG. 16 illustrates an example, non-limiting convolutional long short term memory (ConvLSTM) unit, in accordance with one or more embodiments described herein.
Figure 17:
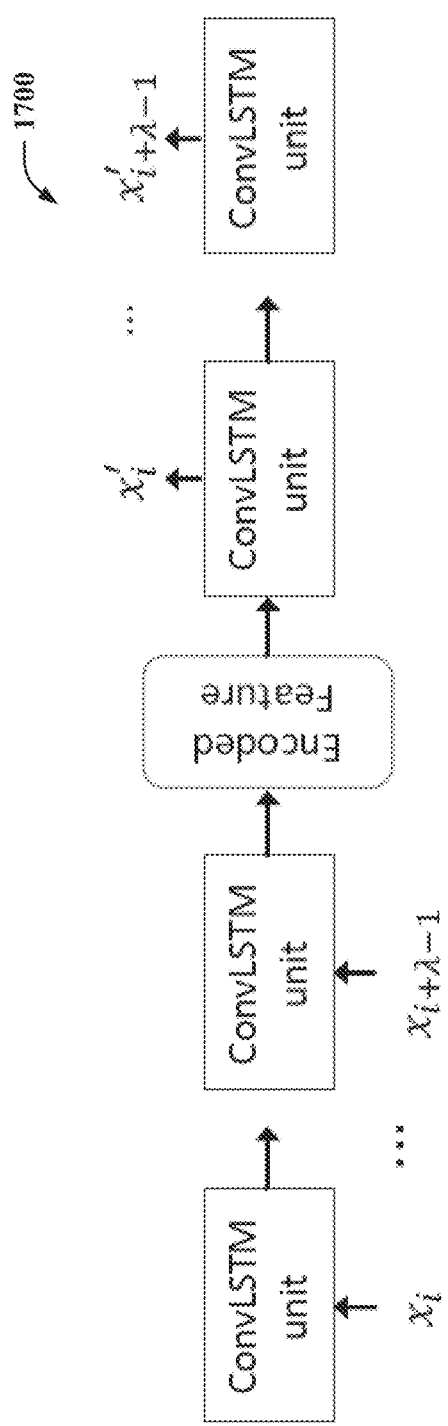
FIG. 17 illustrates an example, non-limiting ConvLSTM-based autoencoder model, in accordance with one or more embodiments described herein.
Figure 18:
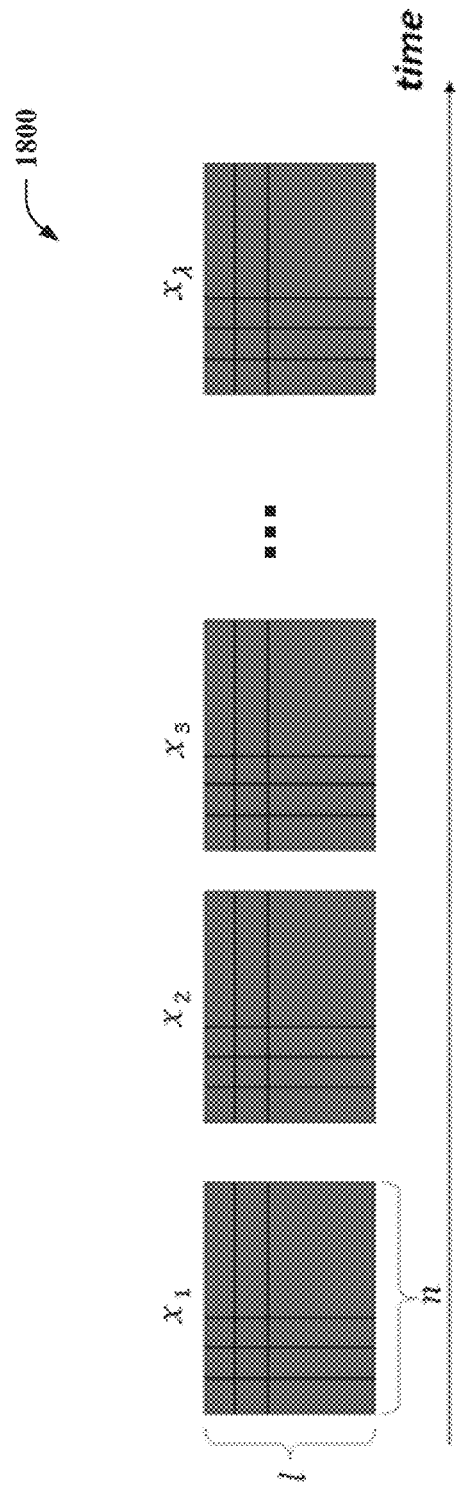
FIG. 18 illustrates an example, non-limiting sequence of $\lambda$ trace frames, in accordance with one or more embodiments described herein.

Embodiments of the disclosed framework further involves building a ConvLSTM-based autoencoder model to learn intra-request and inter-request dependencies using training data comprising the historical trace data $\mathbb{T}$. The ConvLSTM-based autoencoder model takes as input a sequence of λ trace frames, $X = (x_1, x_2, \ldots, x_\lambda)$, such as the example, non-limiting sequence of λ trace frames 1800 illustrated in FIG. 18. The ConvLSTM-based autoencoder model can encode the sequence of λ trace frames into reduced dimensionality and decodes that sequence as $X' = (x'_1, x'_2, \ldots, x'_\lambda)$ with an objective function of minimizing a reconstruction loss between X and X'. A building block of the ConvLSTM-based autoencoder model can be a ConvLSTM unit 1600 as shown in FIG. 16. ConvLSTM unit 1600 comprises a CNN layer 1610 and a LSTM layer 1620. An input to the ConvLSTM unit 1600 can be a trace frame x and a hidden state from a previous trace frame in the sequence of λ trace frames. A ConvLSTM-based autoencoder model 1700 can be constructed by chaining λ ConvLSTM units together in encoding and decoding stages, as illustrated in FIG. 17. At each time step, (i.e., each ConvLSTM unit of ConvLSTM-based autoencoder model 1700), a convolution layer can capture both intra-request and inter-request dependencies by preserving a spatial relationship between a span and its neighbors, which are spans of the same trace and prior or subsequent traces. A LSTM layer of ConvLSTM-based autoencoder model 1700 can learn a temporal dependency in the sequence of λ trace frames. An effect of time step length λ will be discussed in greater detail below with respect to FIGS. 24-25.

Figure 19:
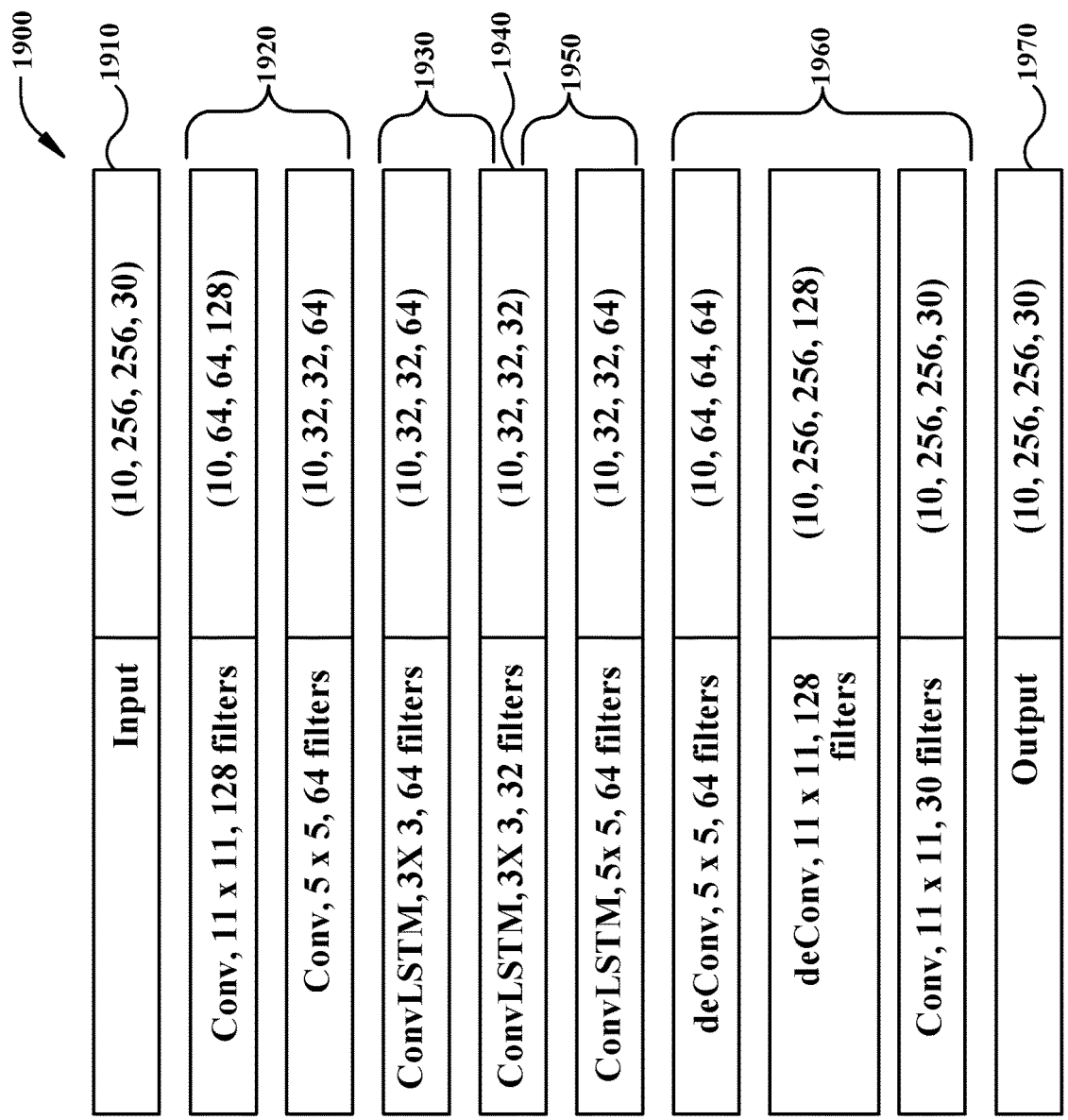
FIG. 19 illustrates an example, non-limiting ConvLSTM-based autoencoder model implemented by stacking multiple pairs of encoding and decoding ConvLSTM units, in accordance with one or more embodiments described herein.

While FIG. 17 illustrates ConvLSTM-based autoencoder model 1700 as comprising one pair of encoding and decoding ConvLSTM units, multiple pairs of encoding and decoding ConvLSTM units can be stacked to implement a ConvLSTM-based autoencoder model in accordance with embodiments of the present disclosure. FIG. 19 illustrates an example, non-limiting ConvLSTM-based autoencoder model 1900 implemented by stacking multiple pairs of encoding and decoding ConvLSTM units, in accordance with one or more embodiments described herein. In FIG. 19, ConvLSTM-based autoencoder model 1900 comprises a time step length λ of 10 trace frames. As discussed above, each trace frame providing input to a ConvLSTM-based autoencoder model includes l traces with n spans in each trace. In FIG. 19, l and n are each set to 256. An embedding size, d, of a d-dimensional vector embedding each span is 30.

As shown by FIG. 19, ConvLSTM-based autoencoder model 1900 includes an input layer 1910, a spatial encoder 1920, a temporal encoder 1930, a bottleneck state layer 1940, a temporal decoder 1950, a spatial decoder 1960, and an output layer 1970. Spatial encoder 1920 can capture spatial dependencies between microservices of a microservice application producing textual trace data embedded in trace frames provided to input layer 1910. Temporal encoder 1930 can capture temporal dependencies between the microservices of the microservice application. A dimensionality of trace frames provided to input layer 1910 can be reduced at bottleneck state layer 1940. Temporal decoder 1950 can reconstruct the temporal dependencies between the microservices of the microservice application. Spatial decoder 1960 can reconstruct the spatial dependencies between the microservices of the microservice application. Reconstructed trace frames of a same dimensionality as trace frames provided to input layer 1910 are provided at output layer 1970.

Equation 4 defines a loss function to measure reconstruction error between an input sequence $X_t$ at time t and an output sequence $X'_t$ for training a ConvLSTM-based autoencoder model.

$$\mathcal{L}_t = \|X_t - X'_t\|_2 = \sum_{i=t}^{t+\lambda-1} e(x_i, x'_i)\qquad\text{Equation 4}$$

In accordance with Equation 4, e(·) can compute an error between two trace frames. Given Equations 2 and 3, e(·) can be written as:

$$e(x, y) = \sum_{i=1}^{l} \|T_i^x - T_i^y\|_2 = \sum_{i=1}^{l} \sum_{j=1}^{n} \|s_j^{T_i^x} - s_j^{T_i^y}\|_2 \quad \text{Equation 5}$$

In accordance with Equation 5, l is a number of traces in a frame, n is a number of spans in a trace, and $\|\cdot\|_2$ denotes an L2 norm.

After training, the span2vec embedding and status models can detect anomalies and/or diagnose root causes in test data comprising historical trace data $\mathbf{T}$ through a reconstruction loss, as defined by Equation 5. First, the span2vec embedding model can convert textual span names in the test data to vectors and can prepare the test data in the format of a trace frame, as defined by Equations 2 and 3. In effect, the trace frames can be applied to a sliding window of λ frames with stride S=1 (i.e., a number of skipped frames as the sliding window proceeds). The λ×l traces in a sliding window can form a batch of input to the status model and generate a reconstruction loss, as defined by Equation 5. A reconstruction loss value for a trace that is classified as "normal" should be in a range $[H_u, H_l]$. A reconstruction loss value for A trace having a reconstruction loss value that is external to that range should be classified as "abnormal". There are various ways of defining $H_u$ and $H_l$ for anomaly detection. In an embodiment, $H_u$ and $H_l$ can be defined as $H_u=95^{th}$ percentile$\{\mathcal{L}_{training}\}$ and $H_l=5^{th}$ percentile $\{\mathcal{L}_{training}\}$, respectively, where $\mathcal{L}_{training}$ are the losses in the training data.

Based on a reconstruction loss computed for a ConvLSTM-based autoencoder model, a diagnosis process (e.g., diagnosis process 1040 of FIG. 10) can greedily select a trace frame that has the most addition to a total loss of a sequence of trace frames: $e^*=\arg \max_x e(x_i, x'_i)$, $x_i \in X_t$), where $X_t$ is the sequence of trace frames classified as abnormal (i.e., $\mathcal{L}_t > H_u \vee \mathcal{L}_t < H_l$). Then in the selected trace frame e*, we recursively select the top-k traces and spans can be recursively selected in an order of their additions, as defined in Equation 5. That way, the search space for the root causes can be guided and narrowed.

The following disclosure describes a setup of an example demonstration for an implementation of the disclosed framework for anomaly detection and/or RCA in microservice applications that will be referred to below as DeepTrace. The example demonstration utilized three microservice applications deployed in a 5-node Kubernetes cluster that included: a ride sharing application, an e-commerce web application; and a social network web application.

The ride sharing application includes a web user interface (UI) that serves user requests and makes RPC calls to 5 backend microservices. The ride sharing application allows two types of user requests: (i) browsing the UI; and (ii) requesting a ride. To request a ride, a user of the ride sharing application selects a destination address and the ride sharing application dispatches a driver. Traces are generated at all microservices comprising the ride sharing application.

The e-commerce web application comprises a more complex architecture than the ride sharing application with 12 microservices and 7 programming languages. The e-commerce web application allows 6 types of user requests, such as adding items to cart, checkout, and setting currency. Each request type involves a subset of the microservices, resulting in different composites of traces. Three microservices of the e-commerce web application do not yield traces as they are not instrumented with a tracing library.

The social network web application includes 36 microservices. Unlike the ride sharing application and e-commerce web application, most of the microservices in the social network web application have its dedicated datastore comprising: memcached for caching or MongoDB for persistent storage. 7 types of requests were considered for the example demonstration, such as, registering new users, authenticating login, composing messages, browsing timelines. Traces are generated at all microservices of the social network web application.

An open-loop workload generator (e.g., LOCUST 2019) was used in the example demonstration that emulates user behavior to drive requests to the three microservice applications. Training data for the open-loop workload generator was collected with a varying number of emulated users, assuming that the microservice applications are healthy. That training data comprises 50K, 57K, 76K traces from the ride sharing application, the e-commerce web application, and the social network web application, respectively.

Test data for the example demonstration was generated with injected anomalies and contains 25K traces. The injected anomalies utilized in the example demonstration are shown below in Table 1. Table 1 lists how the injected anomalies were customized for each microservice application to induce the anomalies for 60 seconds.

TABLE 1

| | Ride Sharing App | E-commerce App | Social Network App |
|---|---|---|---|
| IA-0 | Raise users # by 50% | Raise users # by 50% | Raise users # by 50% |
| IA-1 | Route service | Checkout service | Post storage service |
| IA-2 | MySQL | Checkout service | DB of social graph |
| IA-3 | Frontend-MySQL | Checkout -shipping | UserTimeline-mongodb |
| IA-4 | Reduce route workers | Redis | Redis of Homeline |
| IA-5 | Browsing UI | Checkout | User registration |

Under the IA-0 injected anomaly, the microservice application is healthy and experiences a burst of user requests but has not violated any SLA. As such, the IA-0 injected anomaly is used to assess the robustness of a ConvLSTM-based autoencoder model. Under the IA-1 injected anomaly, a microservice of the microservice application has increased latency, which leads to slow response to requests. Under the IA-2 injected anomaly, a microservice of the microservice application becomes disabled causing failure to some user requests. The IA-1 and IA-2 injected anomalies impact a performance of the microservice application in that some user requests are returned with error or slow response due to undermined microservices.

Under the IA-3 injected anomaly, communication between two microservice of the microservice application is impacted by some network incident, resulting in a high packet loss rate. The IA-3 injected anomaly has the conflated effect of performance and execution anomalies. Under the IA-4 injected anomaly, some caching service or replica of the microservice application is corrupted, which produces atypical traces. Under the IA-5 injected anomaly, the microservice application receives a surge of repetitive requests (e.g., checkout with a fraudulent credit card) corresponding to a form of DDoS attack, which breaks the typical user's request pattern. The IA-4 and IA-5 injected anomalies produce atypical trace patterns inflicted by anomalous request patterns or execution paths.

The example demonstration compared DeepTrace (i.e., the implementation of the disclosed framework) in microservice applications against a number of different methods. All machine learning models of the example demonstration were implemented in Tensorflow and graph traversal in the span2vec embedding algorithm was implemented in Go. The example demonstration compared DeepTrace against a first set of methods comprising a utilization-based approach and tr-PCA. The utilization-based approach monitors CPU and memory usage of cluster nodes. The utilization-based approach signals alarms when any usage exceeds certain threshold (e.g., mean±3·deviation). The other method in the first set of methods, tr-PCA, takes the durations of spans in a trace as an ordered list of logs and applies Principal Component Analysis to find a correlation among the spans. The tr-PCA method finds the correlation among the spans through clustering the normal data using a Mahalanobis distance. If the Mahalanobis distance from test data to the normal class exceeds a threshold, the tr-PCA method identifies the trace as abnormal.

The example demonstration also compared DeepTrace against a deep learning-based set of methods comprising: tr-ED and tr-LED. Both methods of the deep learning-based set of methods use the same input data as tr-PCA. The tr-ED method trains an autoencoder stacked by multiple layers of dense network, while an autoencoder of the tr-LED method uses a LSTM network to capture intra-request dependency.

The example demonstration also compared DeepTrace against two variants of DeepTrace to justify the effectiveness of the span2vec embedding algorithm and the ConvLSTM-based autoencoder model. The first variant of DeepTrace, DT-no-s2v, uses an embedding layer in Tensorflow as a substitute for the span2vec embedding algorithm. The second variant of DeepTrace, DT-LSTM, replaces the ConvLSTM units of the ConvLSTM-based autoencoder model with LSTM units.

The following disclosure describes results of the example demonstration discussed above. The example demonstration uses precision, recall, and F-score to measure the performance of anomaly detection. As anomalies are injected one at a time, the example demonstration calculates metrics for each anomaly separately, and also the average of the F-scores over these anomalies.

Depending on the input/output shape, anomaly detection methods label trace data in various granularities. DeepTrace and the first variant of DeepTrace (DT-no-s2v) take a sequence of $\lambda$ trace frames, each formed by l traces, so they consider the $\lambda \times l$ traces collectively: either all or none are abnormal. The two baselines leveraging LSTM, namely tr-LED and the second variation of DeepTrace (DT-LSTM), label a sequence of traces with the same status. Status is reported individually by the remaining methods tested by the example demonstration—the utilization-based approach, the tr-PCA method, and the tr-ED method. Despite the difference in granularity, metrics are calculated over total traces consistently across these methods.

The example demonstration presents results for the implementation of the disclosed framework and its two variants with d=64, w=5, $\lambda$=10, and l=16. For the other baselines, the example demonstration explores their parameter spaces and reports the best results. FIG. 20 illustrates a table 2000 presenting the results of the example presentation below with the highest (lowest) scores at each column being highlighted in grey background (underlined). Since the IA-0 injected anomaly has no abnormal data, the example demonstration reports accuracy (the last column of table 2000) because in this case precision, recall, and F-score have no meaning (# of true positive is 0). The results presented in table 2000 are emulated results that the example demonstration obtained from random generated data. One skilled in the art will appreciate that aspects of the results presented in table 2000 can be tuned for different data sets in a non-emulated implementation.

Several observations can be made from table 2000. For example, the two non-deep learning baselines (i.e., the utilization-based approach and the tr-PCA method) are unable to effectively handle the anomaly detection task. Table 2000 shows that compared to the deep learning-based set of methods; traditional methods catch less complex relationship in the traces. Intuitively, it can be hard for the utilization-based approach to detect anomalies when resources are underutilized.

Another observation that can be made from table 2000 is that the deep learning-based set of methods that incorporate temporal relationship via the LSTM network perform better than dense network. This observation indicates that the intra-request dependency in a single trace should be considered. Specifically, although trained by the same input data, the tr-LED method outperforms the tr-ED method at most columns. This can be especially true with respect to the IA-3, IA-4, and IA-5 injected anomalies where anomalies are due to irregular execution paths within a single trace.

Another observation that can be made from table 2000 is that DeepTrace, the implementation of the disclosed framework, has the best overall performance among all methods evaluated, with all F-scores>0.8. The two modified versions of DeepTrace also achieve good performance for the ride sharing application and the e-commerce web application. However, the average F-scores of the two variants drop for the social network web application, which has a more complex architecture. For example, with respect to the IA-5 injected anomaly, the two variants miss many anomalous traces for the social network web application (recall=0.37 and 0.59), since the intra-request dependency is barely affected by the repeated adversarial requests. In contrast, DeepTrace can report most of the anomalies (recall=0.7), which confirms the importance of capturing both inter-request and intra-request dependencies and the effectiveness of the span2vec embedding algorithm.

To further understand how anomalous traces are labeled, FIG. 21 illustrates an example, non-limiting graph 2100 that depicts the reconstruction loss of DeepTrace computed for the social network web application with respect to time. In graph 2100, the horizontal lines define a normal range of reconstruction loss between an upper bound ($H_u$) and a lower bound ($H_l$). Moreover, the grey bands in graph 2100 indicate respective durations of the injected anomalies.

Graph 2100 shows that DeepTrace successfully identifies that the social network web application during workload variation (IA-0) is healthy as losses are within a normal range. Graph 2100 further shows as well as the 4 spikes and one dip out of the normal range for each injected anomaly (i.e., injected anomalies IA-1 through IA-5). Of note, graph 2100 shows the reconstruction loss of the IA-5 injected anomaly is below the lower bound, which is different from the other injected anomalies. Since the trace of user registration is shorter than most of the other requests, a large amount of zero padded vectors of registration traces can lead to the reconstruction loss below the threshold. This confirms that setting the lower bound of the normal range of reconstruction losses in the anomaly detection method can be beneficial. Another observation is that the spikes and dip are skewed toward the left on the time axis with respect to the respective injected anomalies. Quantitatively, those misalignments can result in the false positives and false negatives. In some instances, such misalignments can be because DeepTrace classifies status in the granularity of a sequence of trace frames, so the normal traces in an anomalous trace frame at the beginning of a spike can be falsely labeled as abnormal. However, most of the traces are correctly labeled.

The example demonstration investigated how changes to the parameters of DeepTrace, the implementation of the disclosed framework, affect its performance on the anomaly detection. To that end, the example demonstration conducted experiments on the IA-3 and IA-5 injected anomalies as their reconstruction losses change differently in graph 2100 of FIG. 21. While graph 2100 depicts the results for the social network web application, the results are similar to the other applications used in the example demonstration.

The output of the span2vec embedding algorithm can depend on two parameters: the embedding dimension (d) and the size of context window (w). FIGS. 22-23 illustrate example, non-limiting graphs depicting the effects of varying d and w in terms of F-score. Graph 2200 of FIG. 22 shows that increasing the embedding dimension (d) or window size (w) has marginal improvement on the F-score for the IA-3 injected anomaly, which indicates that the results are insensitive to the two parameters. In contrast, graph 2300 of FIG. 23 shows that increasing d=4 to d=32 for the IA-5 injected anomaly raises the performance by greater than 10%, but the gain is unnoticeable or dropped after d=32 due to overfitting. Additionally, it can be noted that increasing window size (w) can reduce the performance with respect to the IA-5 injected anomaly. Recall that under the IA-5 injected anomaly, the anomaly is caused by a surge of repetitive requests, which breaks the inter-request dependency. As a larger context window size considers more relatedness of the spans, more additions are counted to the loss to make them above the lower threshold, decreasing the recall rate and F-score. Therefore, in some instances, it can be beneficial to choose an embedding dimension (d) that is greater than the vocabulary size and a small window size (w) such as 5.

FIGS. 24-25 illustrate example, non-limiting graphs depicting the effects of increasing $\lambda$, the time step length that embodiments of the disclosed framework use as the number of trace frames input to a ConvLSTM-based autoencoder model. In particular, graphs 2400 and 2500 depict the effects of varying time step length $\lambda$ with respect to the IA-3 and IA-5 injected anomalies, respectively. As shown by graphs 2400 and 2500, a larger time step length $\lambda$ can result in higher recall rate but lower precision. The trends are alike with respect to both injected anomalies. Graphs 2400 and 2500 further show that a median time step ($\lambda$=10) can produce improved overall performance with regards to the F-score.

FIG. 26 illustrates a table 2600 depicting the diagnosis results for the social network web application obtained by the example demonstration. As discussed above, once a sequence of trace frames in a sliding window is classified as abnormal, a diagnosis process can first select the frame that has the largest contribution to the reconstruction loss and then the diagnosis process can recursively examine its traces and spans to look for faulty microservices. The top-2 selected traces presented in column 2 of table 2600 are highly relevant to the anomaly types. For certain anomalies such as the IA-1 injected anomaly, it can be straightforward to pinpoint a faulty microservice from a visualized Gantt chart of those traces after recognizing the suspicious traces. For other anomalies, spans from selected traces can be inspected in an order of a span's respective addition to the reconstruction loss and the microservice involved in those spans can be sifted. Column 3 in table 2600 presents the first two or three microservices. Microservices that were identified as faulty are highlighted in bold within column 3 of table 2600. The example demonstration observed that the implementation of the disclosed framework can include the faulty microservices in the list for all anomalies.

Figure 27:
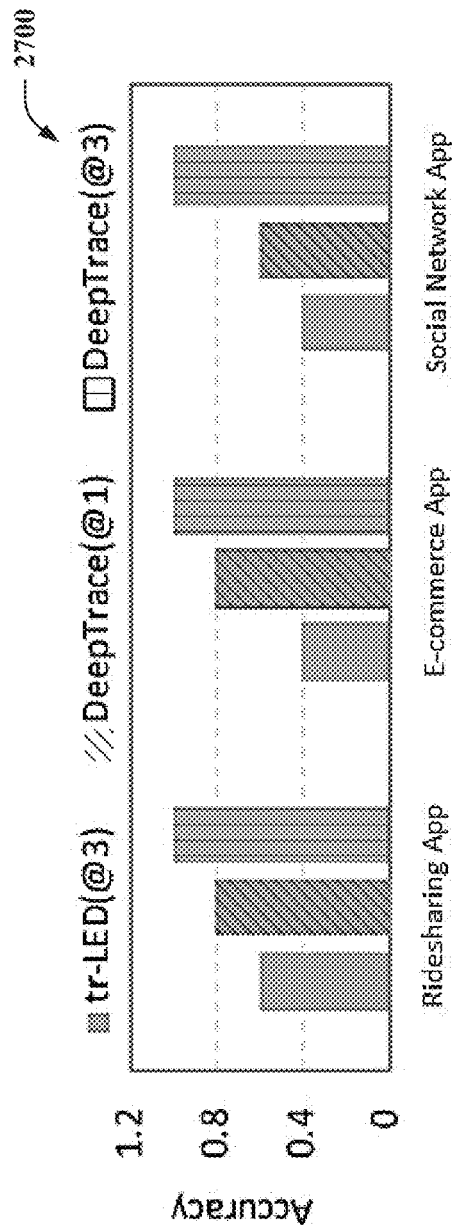
FIG. 27 illustrates an example, non-limiting graph depicting relative diagnosis performances of an example demonstration, in accordance with one or more embodiments described herein.

FIG. 27 illustrates an example, non-limiting graph 2700 depicting relative diagnosis performances for all three microservice applications utilized in the example demonstration. Graph 2700 depicts the relative diagnosis performances in terms of Acc@k over all anomalies. As used herein, Acc@k refers to a probability that an actual faulty microservice is included in the top-k reported microservices. Some baseline methods had poor performance of anomaly detection in the example demonstration that impacted their diagnosis results. As such, graph 2700 only presents the diagnosis performance of the tr-LED method (i.e., the best baseline method except for the two variants of DeepTrace) and apply the same diagnosis method. As shown by FIG. 27, graph 2700 depicts the diagnosis performance results for k=1, 3. It can be observed by comparison of DeepTrace(@3) and DeepTrace(@1) in graph 2700 that a diagnosis accuracy of DeepTrace improves as k increases. It can also be observed from graph 2700 that DeepTrace outperforms the tr-LED method across all three microservice applications.

Figure 28:
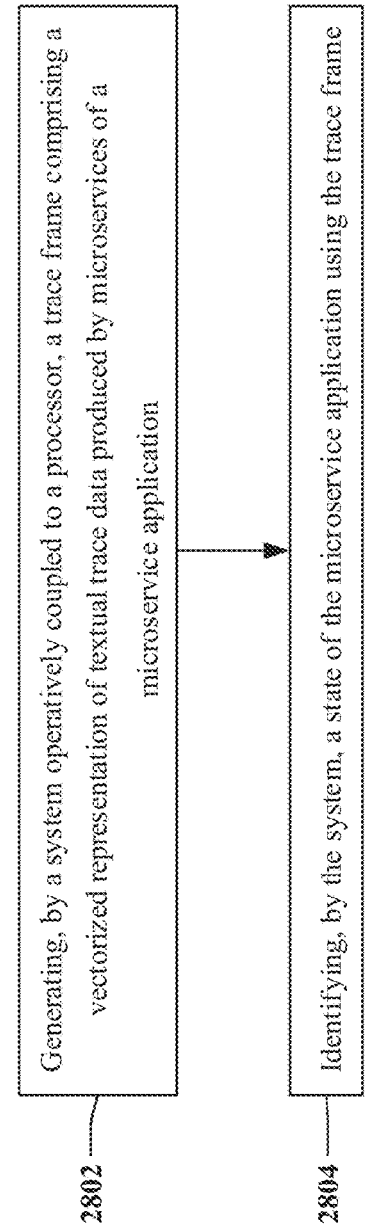
FIG. 28 illustrates a flow diagram of an example, non-limiting computer-implemented method of facilitating anomaly detection and root cause analysis using distributed trace data, in accordance with one or more embodiments described herein.

FIG. 28 illustrates a flow diagram of an example, non-limiting computer-implemented method 2800 of facilitating anomaly detection and root cause analysis using distributed trace data, in accordance with one or more embodiments described herein. Repetitive description of like elements employed in other embodiments described herein is omitted for sake of brevity. At 2802, the computer-implemented method 2800 can comprise generating, by a system operatively coupled to a processor (e.g., with preprocessing component 140), a trace frame comprising a vectorized representation of textual trace data produced by microservices of a microservice application. In an embodiment, the system can generate the trace frame with a machine learning model trained using a graph traversal algorithm, a word embedding technique, or a combination thereof.

At 2804, the computer-implemented method 2800 can comprise identifying, by the system (e.g., with monitor component 150), a state of the microservice application using the trace frame. In an embodiment, the system can identify the state of the microservice application by comparing the trace frame with a reconstructed trace frame generated by a machine learning model. In an embodiment, the machine learning model can capture spatial and temporal dependencies between the microservices of the microservice application when operating in a normal state. In an embodiment, the system can identify the state of the microservice application by comparing a sequence of trace frames with a sequence of reconstructed trace frames generated by a machine learning model. The sequence of trace frames can comprise the trace frame. In an embodiment, the machine learning model can be a ConvLSTM-based autoencoder model. In an embodiment, the computer-implemented method 2800 can further comprise: performing, by the system, RCA by evaluating a contribution of each microservice to a given reconstruction loss.

Figure 29:
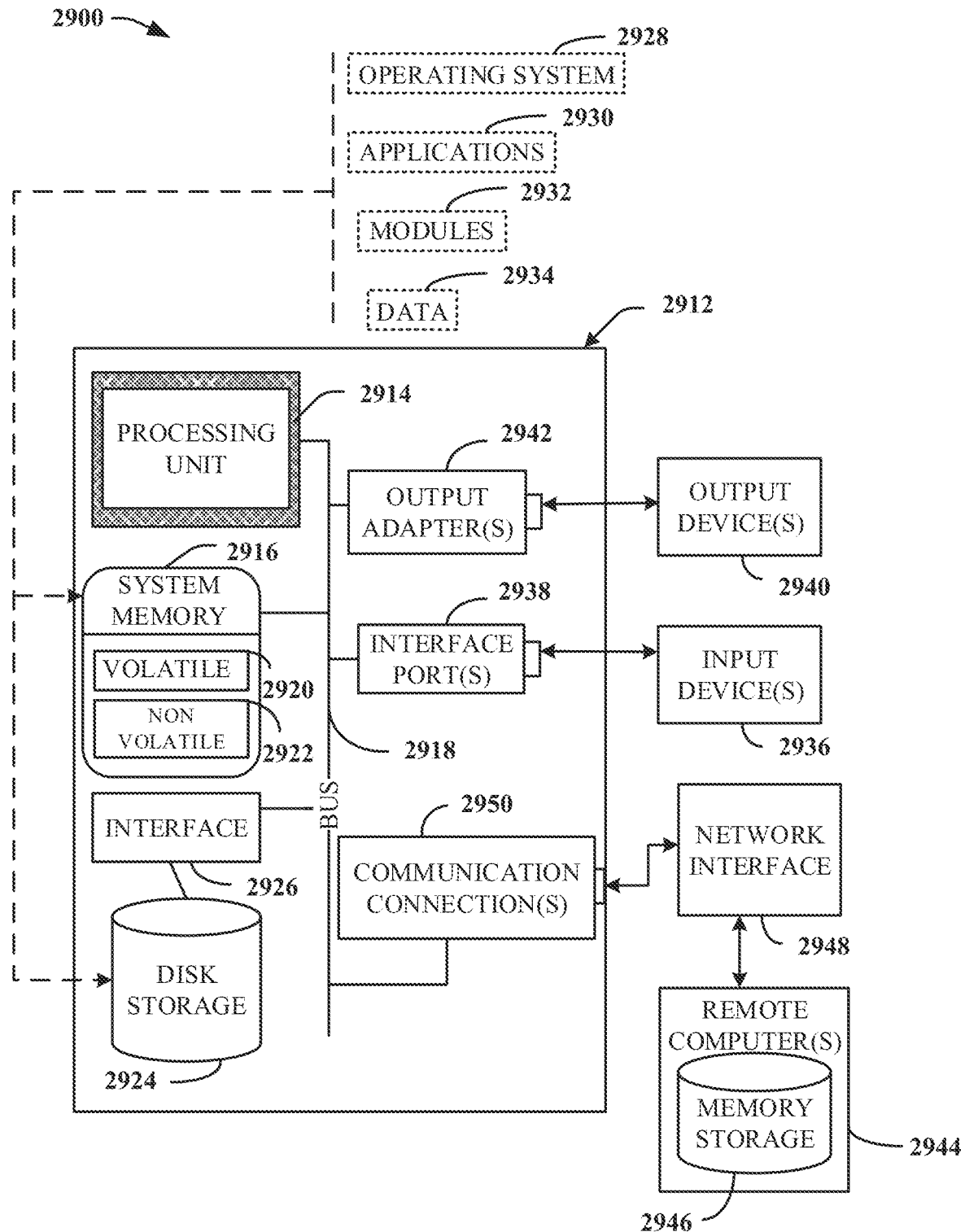
FIG. 29 illustrates a block diagram of an example, non-limiting operating environment in which one or more embodiments described herein can be facilitated.

In order to provide a context for the various aspects of the disclosed subject matter, FIG. 29 as well as the following discussion are intended to provide a general description of a suitable environment in which the various aspects of the disclosed subject matter can be implemented. FIG. 29 illustrates a suitable operating environment 2900 for implementing various aspects of this disclosure can include a computer 2912. The computer 2912 can also include a processing unit 2914, a system memory 2916, and a system bus 2918. The system bus 2918 couples system components including, but not limited to, the system memory 2916 to the processing unit 2914. The processing unit 2914 can be any of various available processors. Dual microprocessors and other multiprocessor architectures also can be employed as the processing unit 2914. The system bus 2918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 2916 can also include volatile memory 2920 and nonvolatile memory 2922. The basic input/output system (BIOS), containing the basic routines to transfer information between elements within the computer 2912, such as during start-up, is stored in nonvolatile memory 2922. By way of illustration, and not limitation, nonvolatile memory 2922 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 2920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 2912 can also include removable/non-removable, volatile/non-volatile computer storage media. FIG. 29 illustrates, for example, a disk storage 2924. Disk storage 2924 can also include, but is not limited to, devices like a magnetic disk drive, floppy disk drive, tape drive, Jaz drive, Zip drive, LS-100 drive, flash memory card, or memory stick. The disk storage 2924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2924 to the system bus 2918, a removable or non-removable interface is typically used, such as interface 2926. FIG. 29 also depicts software that acts as an intermediary between users and the basic computer resources described in the suitable operating environment 2900. Such software can also include, for example, an operating system 2928. Operating system 2928, which can be stored on disk storage 2924, acts to control and allocate resources of the computer 2912. System applications 2930 take advantage of the management of resources by operating system 2928 through program modules 2932 and program data 2934, e.g., stored either in system memory 2916 or on disk storage 2924. It is to be appreciated that this disclosure can be implemented with various operating systems or combinations of operating systems. A user enters commands or information into the computer 2912 through input device(s) 2936. Input devices 2936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2914 through the system bus 2918 via interface port(s) 2938. Interface port(s) 2938 include, for example, a serial port, a parallel port, a game port, and a universal serial bus (USB). Output device(s) 2940 use some of the same type of ports as input device(s) 2936. Thus, for example, a USB port can be used to provide input to computer 2912, and to output information from computer 2912 to an output device 2940. Output adapter 2942 is provided to illustrate that there are some output devices 2940 like monitors, speakers, and printers, among other output devices 2940, which require special adapters. The output adapters 2942 include, by way of illustration and not limitation, video and sound cards that provide a means of connection between the output device 2940 and the system bus 2918. It can be noted that other devices and/or systems of devices provide both input and output capabilities such as remote computer(s) 2944.

Computer 2912 can operate in a networked environment using logical connections to one or more remote computers, such as remote computer(s) 2944. The remote computer(s) 2944 can be a computer, a server, a router, a network PC, a workstation, a microprocessor-based appliance, a peer device or other common network node and the like, and typically can also include many or the elements described relative to computer 2912. For purposes of brevity, only a memory storage device 2946 is illustrated with remote computer(s) 2944. Remote computer(s) 2944 is logically connected to computer 2912 through a network interface 2948 and then physically connected via communication connection 2950. Network interface 2948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2950 refers to the hardware/software employed to connect the network interface 2948 to the system bus 2918. While communication connection 2950 is shown for illustrative clarity inside computer 2912, it can also be external to computer 2912. The hardware/software for connection to the network interface 2948 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes the following computer-executable components stored in memory:
   a preprocessing component that generates a trace frame comprising a vectorized representation of textual trace data produced by microservices of a microservice application; and
   a monitor component that identifies a state of the microservice application using the trace frame.

2. The system of claim 1, wherein the preprocessing component generates the trace frame with a machine learning model trained using a graph traversal algorithm, a word embedding technique, or a combination thereof.

3. The system of claim 1, wherein the monitor component identifies the state of the microservice application by comparing the trace frame with a reconstructed trace frame generated by a machine learning model.

4. The system of claim 3, wherein the machine learning model captures spatial and temporal dependencies between the microservices of the microservice application when operating in a normal state.

5. The system of claim 1, wherein the monitor component identifies the state of the microservice application by comparing a sequence of trace frames with a sequence of reconstructed trace frames generated by a machine learning model, the sequence of trace frames comprising the trace frame.

6. The system of claim 5, wherein the machine learning model encodes the sequence of trace frames.

7. The system of claim 1, further comprising:
   a diagnostic component that performs root cause analysis by evaluating a contribution of each microservice to a given reconstruction loss.

8. A computer-implemented method, comprising:
   generating, by a system operatively coupled to a processor, a trace frame comprising a vectorized representation of textual trace data produced by microservices of a microservice application; and
   identifying, by the system, a state of the microservice application using the trace frame.

9. The computer-implemented method of claim 8, wherein the system generates the trace frame with a machine learning model trained using a graph traversal algorithm, a word embedding technique, or a combination thereof.

10. The computer-implemented method of claim 8, wherein the system identifies the state of the microservice application by comparing the trace frame with a reconstructed trace frame generated by a machine learning model.

11. The computer-implemented method of claim 10, wherein the machine learning model captures spatial and temporal dependencies between the microservices of the microservice application when operating in a normal state.

12. The computer-implemented method of claim 8, wherein the system identifies the state of the microservice application by comparing a sequence of trace frames with a sequence of reconstructed trace frames generated by a machine learning model, the sequence of trace frames comprising the trace frame.

13. The computer-implemented method of claim 12, wherein the machine learning model is a convolutional long short term memory (ConvLSTM)-based autoencoder model.

14. The computer-implemented method of claim 8, further comprising:
    performing, by the system, root cause analysis by evaluating a contribution of each microservice to a given reconstruction loss.

15. A non-transitory computer program product comprising a computer readable storage medium having program instructions embodied therewith, the program instructions executable by a processor to cause the processor to:
    generate, by the processor, a trace frame comprising a vectorized representation of textual trace data produced by microservices of a microservice application; and
    identify, by the processor, a state of the microservice application using the trace frame.

16. The non-transitory computer program product of claim 15, the program instructions executable by the processor to further cause the processor to:
    generate, by the processor, the trace frame with a machine learning model trained using a graph traversal algorithm, a word embedding technique, or a combination thereof.

17. The non-transitory computer program product of claim 15, the program instructions executable by the processor to further cause the processor to:
    identify, by the processor, the state of the microservice application by comparing the trace frame with a reconstructed trace frame generated by a machine learning model.

18. The non-transitory computer program product of claim 17, wherein the machine learning model captures spatial and temporal dependencies between the microservices of the microservice application when operating in a normal state.

19. The non-transitory computer program product of claim 15, the program instructions executable by the processor to further cause the processor to:
    identify, by the processor, the state of the microservice application by comparing a sequence of trace frames with a sequence of reconstructed trace frames generated by a machine learning model, the sequence of trace frames comprising the trace frame.

20. The non-transitory computer program product of claim 15, the program instructions executable by the processor to further cause the processor to:
    perform, by the processor, root cause analysis by evaluating a contribution of each microservice to a given reconstruction loss.

\* \* \* \* \*